US011251685B2

(12) United States Patent
Nakahara et al.

(10) Patent No.: US 11,251,685 B2
(45) Date of Patent: Feb. 15, 2022

(54) ROTOR CORE WITH CONCAVE PORTIONS BETWEEN FLAKE PORTIONS AND BASE PORTIONS WITH DIMENSIONS

(71) Applicant: Nidec Corporation, Kyoto (JP)

(72) Inventors: Yasuaki Nakahara, Kyoto (JP); Takeshi Honda, Kyoto (JP); Junichi Uno, Kyoto (JP); Takayuki Migita, Kyoto (JP); Hiroshi Kitagaki, Kyoto (JP); Tsuyoshi Nakamura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 139 days.

(21) Appl. No.: 16/474,267

(22) PCT Filed: Dec. 26, 2017

(86) PCT No.: PCT/JP2017/046706
§ 371 (c)(1),
(2) Date: Jun. 27, 2019

(87) PCT Pub. No.: WO2018/124093
PCT Pub. Date: Jul. 5, 2018

(65) Prior Publication Data
US 2020/0127539 A1 Apr. 23, 2020

(30) Foreign Application Priority Data
Dec. 28, 2016 (JP) .............................. JP2016-254838

(51) Int. Cl.
*H02K 15/03* (2006.01)
*H02K 1/27* (2022.01)
(Continued)

(52) U.S. Cl.
CPC ............. *H02K 15/03* (2013.01); *H02K 1/276* (2013.01); *H02K 1/28* (2013.01); *H02K 15/12* (2013.01);
(Continued)

(58) Field of Classification Search
CPC ........... H02K 2213/03; H02K 2201/09; H02K 15/03; H02K 15/12; H02K 29/03;
(Continued)

(56) References Cited

U.S. PATENT DOCUMENTS

| 8,519,588 B2 * | 8/2013 | Amrhein ................ H02K 1/276 310/156.56 |
| 9,559,572 B2 * | 1/2017 | Fang ....................... H02K 15/03 |
| 2008/0252166 A1 * | 10/2008 | Shiga .................... H02K 1/2786 310/156.56 |

(Continued)

FOREIGN PATENT DOCUMENTS

| JP | 11-308821 A | 11/1999 |
| JP | 2004-229442 A | 8/2004 |

(Continued)

OTHER PUBLICATIONS

JP2008099479 English Translation.*
JP2005333762 English Translation.*
Official Communication issued in International Patent Application No. PCT/JP2017/046706, dated Mar. 6, 2018.

*Primary Examiner* — Maged M Almawri
(74) *Attorney, Agent, or Firm* — Keating & Bennett

(57) ABSTRACT

A method of manufacturing a rotor core, the method including laminating first laminated steel plates in an axial direction. The first laminated steel plates each include a plurality of flake portions arranged in a circumferential direction with gaps between each other and a plurality of protrusions protruding radially outward from an outer side surface of a base portion and each having at least a portion located in the gap between the flake portions. The method further includes fixing the base portions to each other and fixing the flake portions to each other. The method further includes removing the protrusions of the laminated steel plates radially outward.

10 Claims, 30 Drawing Sheets

(51) Int. Cl.
  *H02K 1/28* (2006.01)
  *H02K 15/12* (2006.01)
  *H02K 21/16* (2006.01)

(52) U.S. Cl.
  CPC ......... *H02K 21/16* (2013.01); *H02K 2201/09* (2013.01)

(58) Field of Classification Search
  CPC ........ H02K 1/27; H02K 1/2706; H02K 1/276; H02K 1/2766; H02K 1/2713; H02K 1/272; H02K 1/2726; H02K 1/2733; H02K 1/274; H02K 1/2753; H02K 1/2773; H02K 1/278; H02K 1/2786; H02K 21/16
  USPC ........................................ 310/156.01–156.84
  See application file for complete search history.

(56) References Cited

U.S. PATENT DOCUMENTS

| | | | | |
|---|---|---|---|---|
| 2011/0127859 | A1* | 6/2011 | Amrhein | H02K 1/276 310/43 |
| 2015/0001978 | A1* | 1/2015 | Haga | H02K 1/28 310/156.12 |
| 2018/0358871 | A1* | 12/2018 | Hasuo | H02K 15/022 |

FOREIGN PATENT DOCUMENTS

| | | | |
|---|---|---|---|
| JP | 2005333762 | * | 3/2005 |
| JP | 2005-333762 A | | 12/2005 |
| JP | 2007-295668 A | | 11/2007 |
| JP | 2008-099479 A | | 4/2008 |
| JP | 2008099479 | * | 9/2008 |
| JP | 2013-081312 A | | 5/2013 |
| WO | 2016/076321 A1 | | 5/2016 |

* cited by examiner

ROTOR CORE WITH CONCAVE PORTIONS BETWEEN FLAKE PORTIONS AND BASE PORTIONS WITH DIMENSIONS

CROSS REFERENCE TO RELATED APPLICATIONS

This is the U.S. national stage of PCT Application No. PCT/JP2017/046706, filed on Dec. 26, 2017, and priority under 35 U.S.C. § 119(a) and 35 U.S.C. § 365(b) is claimed from Japanese Application No. 2016-254838, filed Dec. 28, 2016; the disclosures of which are incorporated herein by reference.

1. FIELD OF THE INVENTION

The present disclosure relates to a method of manufacturing a rotor core, which is used for a motor, a rotor, and the motor.

2. BACKGROUND

Conventionally, a motor in which a rotor having a magnet and a shaft is disposed radially inward from an annular stator having a magnetizing coil is widely known. Upon driving of the motor, magnetic flux of the magnet loops inside the rotor in some cases. Consequently, there has been a concern that the magnetic flux of the magnet may not be utilized effectively. Thus, a structure for causing magnetic flux to flow smoothly between the rotor and the stator has been proposed.

The conventional electric motor for electric power steering has a rotor yoke with an arc-shaped outer circumference, a magnet embedded in the rotor yoke, and flux barriers including through-holes passing through the rotor yoke that are disposed at both sides of a short side of the magnet in a virtual plane orthogonal to a central axis. With this configuration, the passage of magnetic flux can be suppressed or blocked using the flux barrier. Accordingly, it can be expected that the magnetic flux flows smoothly between the rotor and the stator.

However, in the conventional electric motor for electric power steering, there is a concern that a leakage of magnetic flux may occur in an area of a steel plate present between flux barriers adjacent in the circumferential direction. In the electric motor for electric power steering, there has been a concern that, when a leakage of magnetic flux occurs, magnetic flux may become a magnetic flux loop inside a rotor core, and thus the magnetic flux of the magnet may not be utilized effectively.

SUMMARY

An example embodiment of a rotor core manufacturing method of the present disclosure is a method of manufacturing a rotor core which includes laminated steel plates which extend in a radial direction from a central axis and are laminated in an axial direction. The laminated steel plates include a base portion located radially outward from the central axis and a plurality of flake portions radially outward from the base portion. The method includes laminating first ones of the plurality of laminated steel plates in the axial direction, each of the first ones of the plurality of laminated steel plates includes the base portion, the plurality of flake portions spaced apart from the base portion on a radially outer side of the base portion with gaps therebetween and arranged in a circumferential direction with gaps between each other, and a plurality of protrusions protruding radially outward from an outer side surface of the base portion and each including at least a portion located in the gaps between the flake portions. The method further includes fixing the base portions laminated in the axial direction and fixing the flake portions laminated in the axial direction. The method also includes removing the protrusions of the laminated steel plates in a radially outward direction.

An example embodiment of a rotor of the present disclosure includes a rotor core including a plurality of base portions located radially outward from a central axis and a plurality of flake portions radially outward from the plurality of base portion, and a plurality of magnets disposed inside the rotor core. In the rotor core, first laminated steel plates are laminated in an axial direction. Each of the first laminated steel plates includes one of the plurality of base portions, ones the plurality of flake portions spaced apart from the one of the plurality of base portions on a radially outer side of the one of the plurality of base portions with gaps therebetween and arranged in a circumferential direction with gaps between each other, and concave portions concave radially inward from an outer surface of the one of the plurality of base portions. The concave portions are defined in corner portions where portions of the one of the plurality of base portions facing the flake portions in a radial direction are adjacent in a circumferential direction, and circumferential widths of the concave portions are either the same in the radial direction or are larger on a radially outer side than on a radially inner side.

An example motor of the present disclosure includes a rotor of the above configuration.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the accompanying drawings. In the present specification, a direction in which a rotation axis of a motor extends will be simply referred to as an "axial direction," a direction orthogonal to the rotation axis of the motor with the rotation axis as the center will be simply referred to as a "radial direction," and a direction along an arc with the rotation axis of the motor as the center will be simply referred to as a "circumferential direction." A central axis of a rotor core corresponds to a central axis of the motor. Also, in the present specification, for convenience of description, the shape and positional relationship of each portion will be described with the axial direction as the vertical direction. Further, this definition of the vertical direction does not limit the direction of use of the motor. Furthermore, in the present specification, an end face cut in a plane orthogonal to an axis will be referred to as a "lateral end view." Also, the term "parallel" used herein does not mean parallel in a strict sense, but includes a meaning of being nearly parallel.

Figure 1:
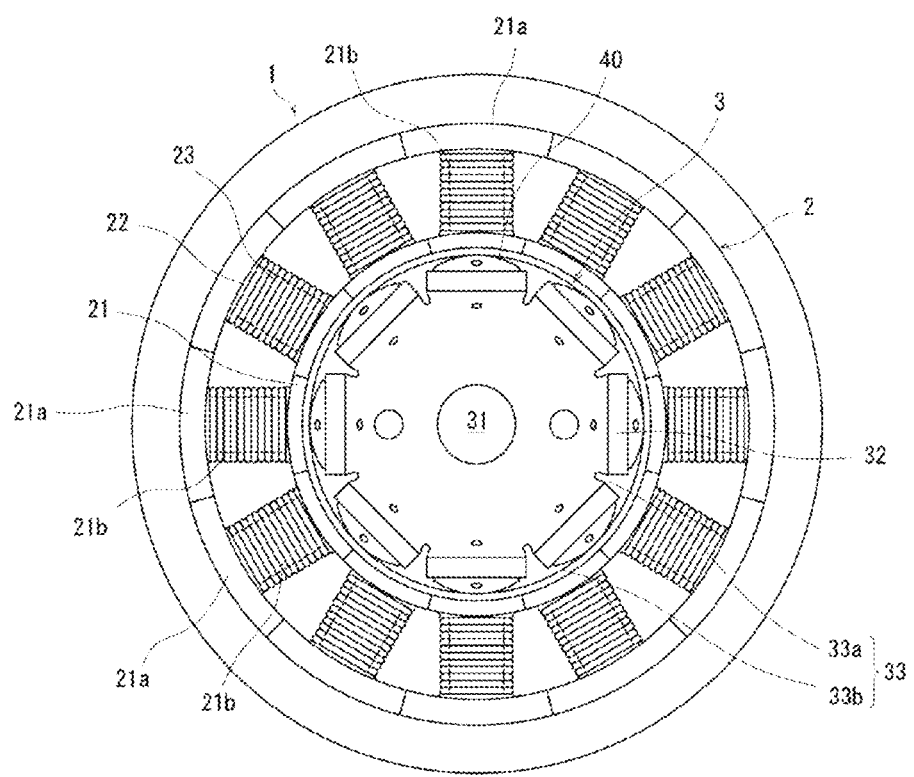
FIG. 1 is a lateral end view of a motor according to an example embodiment the present disclosure.
Figure 2:
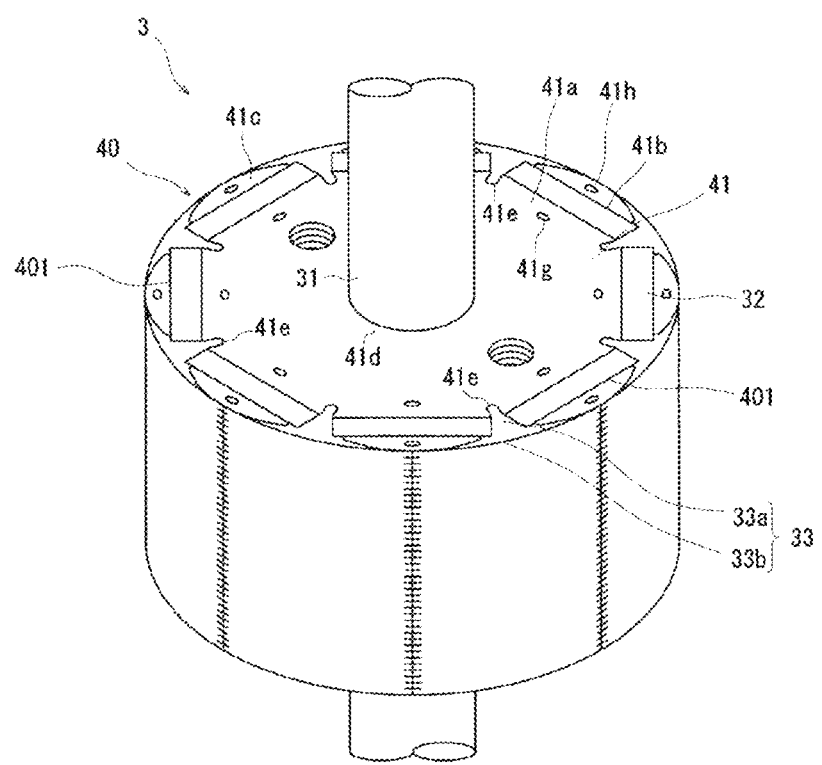
FIG. 2 is a top perspective view of a rotor provided in the motor illustrated in FIG. 1.

A schematic configuration of a motor according to a first example embodiment of the present disclosure will be described. FIG. 1 is a lateral end view of a motor according to the present disclosure. FIG. 2 is a top perspective view of a rotor provided in the motor illustrated in FIG. 1.

As illustrated in FIG. 1, a motor 1 has a stator 2 and a rotor 3.

The stator 2 has, for example, a cylindrical shape extending in the axial direction. The stator 2 is disposed radially outward from a rotor 3 at a predetermined interval. The stator 2 has a stator core 21, an insulator 22, and a coil 23.

The stator core 21 has a tubular shape extending in the axial direction. The stator core 21 is formed by axially laminating a plurality of magnetic steel plates. The stator core 21 has a core back 21a and teeth 21b. The core back 21a has a circular ring shape. The teeth 21b extend radially inward from an inner circumferential surface of the core back 21a. The plurality of teeth 21b are provided in the circumferential direction at predetermined intervals.

The insulator 22 is provided to surround outer surfaces of the teeth. The insulator 22 is disposed between the stator core 21 and the coil 23. The insulator 22 is made of, for example, an electric insulation member such as synthetic resin. The coil 23 is formed by winding a conductive wire around an outer circumference of the insulator 22.

As illustrated in FIG. 2, the rotor 3 has a cylindrical shape extending in the axial direction. The rotor 3 is disposed radially inward from the stator 2 at a predetermined interval. The rotor 3 has a shaft 31, a rotor core 40, a magnet 32, and a resin portion 33. The resin portion 33 has a columnar portion 33a and an outer circumferential portion 33b.

The shaft 31 is a rotation axis of the motor 1. The shaft 31 has a circular column shape extending in the vertical direction. The shaft 31 is rotatably supported by being inserted into an upper bearing and a lower bearing (both not illustrated) provided above and below the rotor 3. The rotor 3 rotates about the shaft 31, which extends in the vertical direction.

The rotor core 40 has a cylindrical shape extending in the axial direction. The shaft 31 is inserted into a shaft hole 41d located at the center of the rotor core 40 in the radial direction. A central axis of the rotor core 40 corresponds to a central axis of the shaft 31 of the motor 1. The rotor core 40 is configured by, for example, laminating a plurality of magnetic steel plates in the axial direction. The rotor core 40 will be described in detail below.

The magnet 32 is disposed radially inward from a flake portion 41c of the rotor core 40. A plurality of magnets 32 are disposed side by side in the circumferential direction at predetermined intervals. For example, eight magnets 32 are provided. That is, the plurality of magnets 32 are disposed inside the rotor core 40. The magnet 32 has a rectangular parallelepiped shape, in which a bottom surface has a substantially rectangular shape, and extends in the axial direction. An axial length of the magnet 32 is substantially equal to an axial length of the rotor core 40. The magnet 32 is supported by the rotor core 40.

The columnar portion 33a is provided between the magnets 32 adjacent in the circumferential direction. For example, in a case in which eight magnets 32 are provided, the columnar portion 33a is provided at eight spots. The columnar portion 33a passes through the rotor core 40 in the axial direction. By providing the columnar portion 33a, it is possible to more effectively utilize magnetic flux of the magnet 32 in the rotor 3.

The outer circumferential portion 33b is provided on a radially outer side of the columnar portion 33a. The outer circumferential portion 33b is provided at eight spots. An outer circumferential surface of the outer circumferential portion 33b has a substantially semi-circular shape and extends in the axial direction.

At the outer circumferential portion of the rotor 3, the resin portion 33 is formed by pouring a synthetic resin, an adhesive, or the like into a space portion surrounded by a mold disposed at a radially outer side of the rotor core 40 and curing the poured synthetic resin, adhesive or the like. Consequently, the resin portion 33 serves as a flux barrier.

Figure 3:
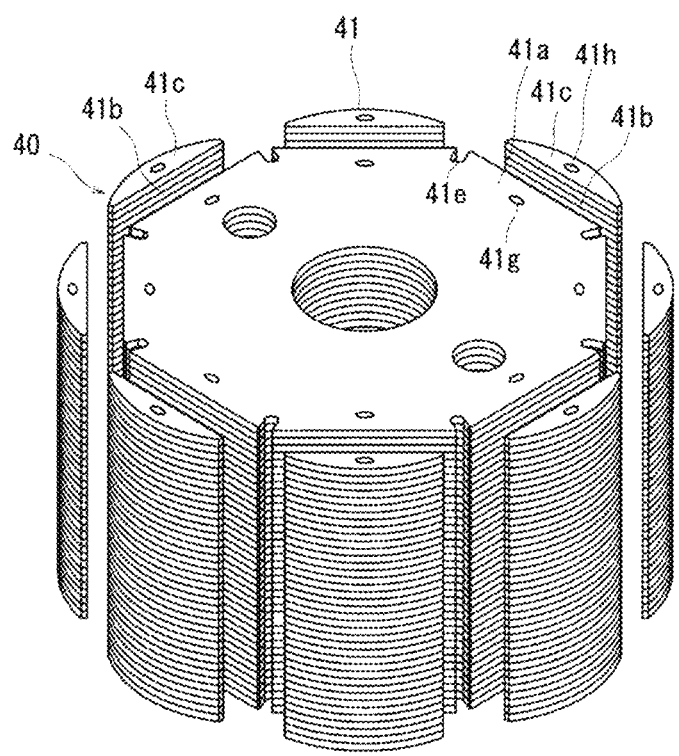
FIG. 3 is a top perspective view of a rotor core provided in the rotor illustrated in FIG. 2.
Figure 4:
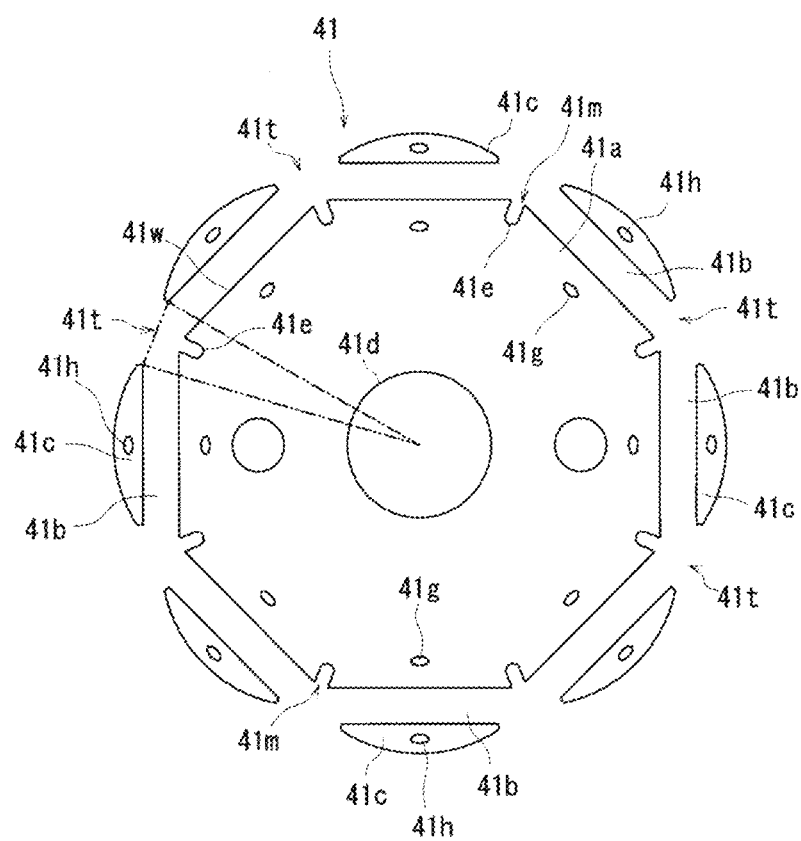
FIG. 4 is a plan view of a first laminated steel plate of the rotor core illustrated in FIG. 3.
Figure 5:
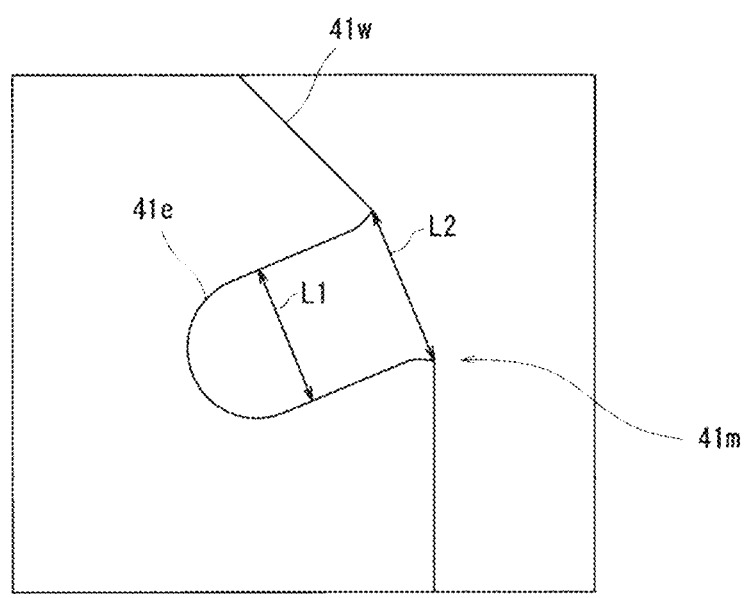
FIG. 5 is an enlarged view of a concave portion of the first laminated steel plate illustrated in FIG. 4.

Next, a detailed configuration of the rotor core 40 will be described. FIG. 3 is a top perspective view of a rotor core provided in the rotor illustrated in FIG. 2. FIG. 4 is a plan view of a first laminated steel plate of the rotor core illustrated in FIG. 3. FIG. 5 is an enlarged view of a concave portion of the first laminated steel plate illustrated in FIG. 4.

As illustrated in FIG. 3, the rotor core 40 has a first laminated steel plate 41. The first laminated steel plate 41 expands in the radial direction with respect to the central axis of the rotor core 40. A plurality of first laminated steel plates 41 are laminated in the axial direction in the rotor core 40.

As illustrated in FIG. 4, the first laminated steel plate 41 has a first base portion 41a and a flake portion 41c.

The first base portion 41a is located radially outward from the central axis. An outer shape of the first base portion 41a may be substantially octagonal shaped. Further, the outer shape of the first base portion 41a is not limited to being substantially octagonal shaped and may also be a circular shape or a polygonal shape such as being substantially hexagonal shaped, substantially dodecagonal shaped, or the like. The first base portion 41a has, at the center thereof in the radial direction, the shaft hole 41d through which the shaft 31 passes in the axial direction. Also, the first base portion 41a includes, in the vicinity of the central portion of each side of the substantially octagonal shape, a base caulking portion 41g which protrudes from a lower surface and has a concave upper surface (see FIG. 10 which will be described below).

Further, a protruding direction of the base caulking portion 41g is not limited thereto, and the base caulking portion 41g may also protrude upward from an upper surface and have a concave lower surface. The direction is not limited as long as the direction is the same in base caulking portions 41g overlapping vertically. That is, the first base portions 41a include eight base caulking portions 41g. Further, although the base caulking portion 41g has an elliptical shape when viewed from the axial direction in the present example embodiment, the shape of the base caulking portion 41g is not limited thereto and may also be a circular shape or a polygonal shape. Also, the number of base caulking portions 41g is not limited to eight, and although it is desirable to provide a plurality of base caulking portions 41g in order to enable stable fixing, the number of base caulking portions 41g may also be one. It is desirable that the base caulking portions 41g be provided at locations where a magnetic field generated by the magnet 32 is not easily disturbed when the magnet 32 is installed in the rotor core 40.

The flake portion 41c is disposed to be spaced apart from the first base portion 41a on a radially outer side of the first base portion 41a with a gap 41b therebetween. A plurality of flake portions 41c are disposed in the circumferential direction at predetermined intervals. That is, the plurality of flake portions 41c are arranged at the radially outer side of the first base portion 41a. For example, eight flake portions 41c are respectively provided radially outside the sides at eight spots along the outer periphery of the first base portion 41a. The plurality of flake portions 41c are arranged in the circumferential direction with gaps 41t therebetween. Plan-view shapes of the flake portions 41c include a circular arc shape whose center is misaligned radially outward from the central axis of the shaft 31 such that a radius is smaller than the radius of the rotor 3 and include a substantially semi-circular shape having a linear portion corresponding to a chord located radially inward from the circular arc shape. The radially inner linear portion of the flake portion 41c is nearly parallel to an outer side surface 41w of the first base portion 41a.

A piece caulking portion 41h is formed at the center of each flake portion 41c. Although the piece caulking portion 41h has an elliptical shape when viewed from the axial direction, the shape of the piece caulking portion 41h is not limited thereto and may also be a circular shape or a polygonal shape.

Also, a circumferential length of the flake portion 41c is smaller than a circumferential length of the magnet 32. According to this configuration, it is possible to improve magnetic characteristics concerning cogging torque. Accordingly, it is possible to reduce the cogging torque. Furthermore, it is possible to suppress the occurrence of magnetic flux loop inside the rotor core 40.

The first base portion 41a has a concave portion 41e. The concave portion 41e is provided in an angle region between the adjacent flake portions 41c in the circumferential direction with respect to the central axis. That is, the concave portion 41e is provided in a corner portion 41m where portions of the first base portion 41a facing the flake portion 41c in the radial direction are adjacent in the circumferential direction. In other words, the concave portion 41e is formed in the columnar portion 33a of the resin portion 33. An example of a fan-shaped angle region between the flake portions 41c adjacent in the circumferential direction with respect to the central axis is drawn in FIG. 4 by a two-dot chain line. As illustrated in FIG. 5, a circumferential width of the concave portion 41e is the same width L1 in the radial direction on the radially inner side, and a width L2 on the radially outer side is larger than the inner width L1. That is, the concave portion 41e has a constant width L1 on the radially inner side and expands radially outward on the radially outer side. That is, the circumferential width of the concave portion 41e is the same in the radial direction or is larger on the radially outer side than on the radially inner side. With such a structure, it becomes easy to extract a protrusion 41f, which will be described below, radially outward.

The concave portion 41e is concave radially inward from the outer side surface 41w of the first base portion 41a. In a case in which the first base portion 41a has a polygonal shape, the concave portion 41e is concave radially inward from each apex of the first base portion 41a. The first base portion 41a includes the concave portion 41e. A synthetic resin, an adhesive, or the like is poured into a gap surrounded by the laminated first base portion 41a, flake portion 41c, and a lamination mold 51, which will be described below. Consequently, the synthetic resin, adhesive, or the like infiltrates into the concave portion 41e, and the columnar portion 33a of the resin portion 33 is formed.

The rotor core 40 illustrated in FIGS. 2 and 3 is configured by laminating a plurality of first laminated steel plates 41 in the axial direction. At this time, first base portions 41a of the plurality of first laminated steel plates 41 overlap each other in the axial direction. Also, the flake portions 41c arranged in the circumferential direction overlap each other in the axial direction. The first base portions 41a overlap each other with the shapes thereof made to correspond in the axial direction. Also, the flake portions 41c overlap each other with the shapes thereof made to correspond in the axial direction. Further, the first base portions 41a and the flake portions 41c do not necessarily have to correspond in the axial direction but may be partially misaligned. Such a misaligned structure is known as rotor skew. By adopting this structure, it is possible to reduce the cogging torque.

In the rotor core 40, the gaps 41b between the first base portion 41a and the flake portions 41c overlap each other in the axial direction to form a mounting hole 401 passing through in the axial direction. The rotor core 40 includes mounting holes 401 provided at eight spots. Then, one magnet 32 is provided for each of the mounting holes 401 at the eight spots (see FIGS. 1 and 2).

Then, the first base portions 41a are fixed to each other by caulking using the base caulking portion 41g. Also, the flake portions 41c are fixed to each other by caulking using the piece caulking portion 41h. Further, the caulking using the base caulking portion 41g and the piece caulking portion 41h will be described in detail below.

With the rotor core 40 configured as described above, there is no region of a steel plate over the entire region in the circumferential direction between the first base portions 41a and the flake portions 41c of the first laminated steel plates 41. Consequently, a flux barrier such as air and resin (here, the resin portion 33 filled with resin) can be provided between the first base portion 41a and the flake portion 41c. Then, since a metal is not disposed in a portion where the flux barrier is formed, the magnetic flux loop is difficult to occur. Also from this, it is possible to more effectively utilize the magnetic flux of the magnet 32.

A method of manufacturing the above-described rotor core will be described with reference to the accompanying drawings. In the rotor core 40, the first laminated steel plates 41 are inserted into the lamination mold 51 and laminated. At this time, regarding the first base portion 41a of the first laminated steel plate 41 illustrated in FIG. 4, there is a case in which it is difficult to make fine adjustments such as position alignment inside the lamination mold 51. Thus, in the method of manufacturing the rotor core 40 according to the present disclosure, a first laminated steel plate 41 including a protrusion 41f illustrated in FIG. 6 is used.

Figure 6:
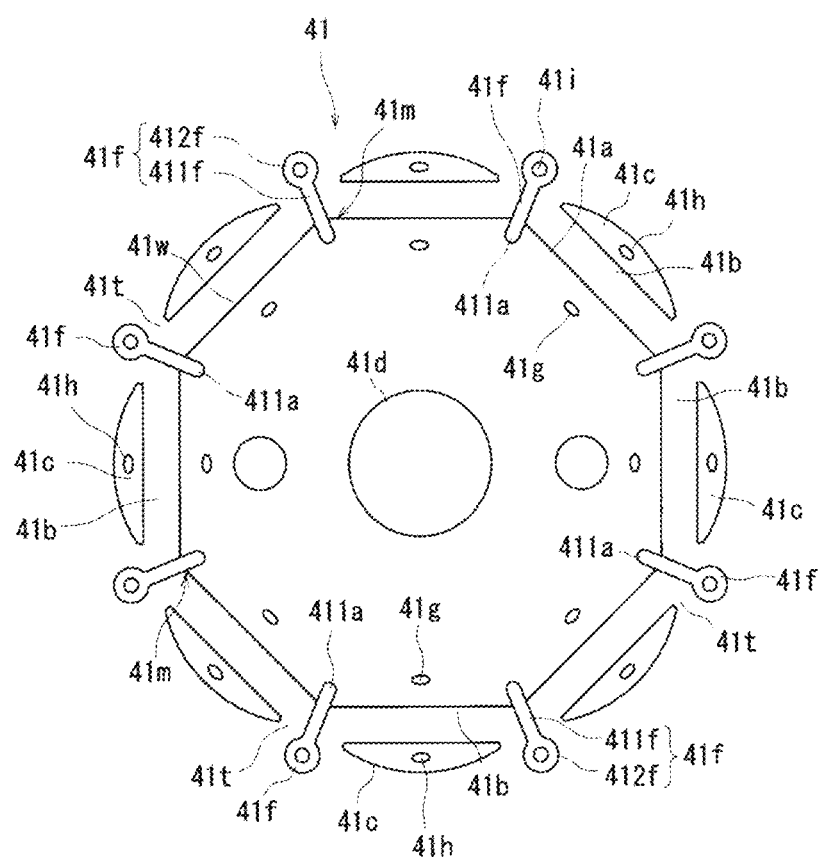
FIG. 6 is a plan view of the first laminated steel plate before lamination.
Figure 7:
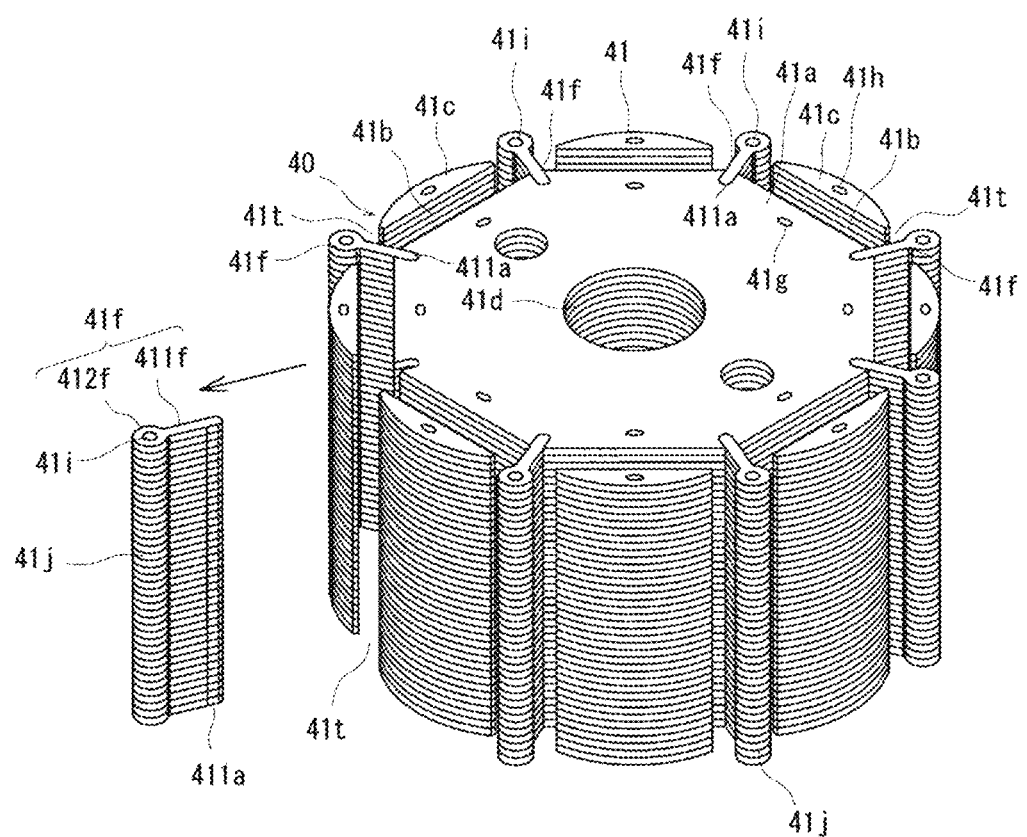
FIG. 7 is a perspective view illustrating a state in which the first laminated steel plate illustrated in FIG. 6 is laminated.

FIG. 6 is a plan view of the first laminated steel plate before lamination. FIG. 7 is a perspective view illustrating a state in which the first laminated steel plate illustrated in FIG. 6 is laminated. As illustrated in FIG. 6, at the time of lamination, a plurality of protrusions 41f protruding radially outward from corner portions 41m, where portions of the first base portion 41a facing the flake portions 41c in the radial direction are adjacent in the circumferential direction, are formed at the first base portion 41a of the first laminated steel plate 41. As illustrated in FIG. 6, the protrusions 41f protrude radially outward from the corner portions 41m of the first base portion 41a which has a substantially octagonal shape. Then, portions of the protrusions 41f are located in the gaps 41t between the flake portions 41c adjacent in the circumferential direction. That is, the plurality of protrusions 41f are provided at the first base portion 41a, and the protrusions 41f protrude radially outward from the outer side surface 41w of the first base portion 41a such that at least a portion of each protrusion 41f is located in the gap 41t.

As illustrated in FIGS. 6 and 7, the protrusion 41f has a connecting portion 411f and a wide width portion 412f. The connecting portion 411f is connected to the outer side surface 41w of the first base portion 41a and extends radially outward. The connecting portion 411f has a constant circumferential width regardless of a position thereof in the radial direction. That is, the connecting portion 411f is connected to the first base portion 41a and extends radially outward.

The wide width portion 412f has a circular shape when viewed in the axial direction and is provided at a radially outer end of the connecting portion 411f. The wide width portion 412f has a portion whose radial width is larger than a radial width of the connecting portion 411f. That is, the wide width portion 412f is provided radially outward from the connecting portion 411f and has a portion whose circumferential width is larger than a circumferential width of the connecting portion 411f. Further, although the wide width portion 412f has a circular shape when viewed in the axial direction, the shape of the wide width portion 412f is not limited thereto and may also be an elliptical shape, a polygonal shape, or the like. By causing the circumferential width of the wide width portion 412f to be larger than that of the connecting portion 411f in the protrusion 41f, the protrusion 41f can be easily pinched by an extracting tool Gd (see FIG. 15 which will be described below). Also, a portion of the wide width portion 412f of the protrusion 41f may be disposed radially outward from the gap 41t. In a removing step which will be described below, the protrusion 41f can be easily grasped by the extracting tool Gd which will be described below. The removing step is facilitated as much as the ease of grasping the protrusion 41f. Also, since the protrusion 41f is outside the gap 41t, the protrusion 41f can be easily pressed such that handling of the first base portion 41a in the lamination mold 51, which will be described below, is facilitated.

A removal margin 411a is provided at a portion of the first base portion 41a connected to the protrusion 41f. The removal margin 411a is connected to a radially inner side of the protrusion 41f. Then, the removal margin 411a is removed together with the protrusion 41f when the protrusion 41f is extracted radially outward so that the concave portion 41e is formed. The removal margin 411a is formed integrally with the protrusion 41f. Then, in the first laminated steel plate 41, at least a portion of the removal margin 411a is in a cut state. Further, the removal margin 411a is formed by, for example, a push back process. A method of forming the removal margin 411a will be described in detail below.

Also, a protrusion caulking portion 41i is formed at the center of the wide width portion 412f. The protrusion caulking portion 41i has a circular shape when viewed in the axial direction, but the shape thereof is not limited thereto. For example, the shape of the protrusion caulking portion 41i may also be an elliptical shape or a polygonal shape. When the first base portions 41a are laminated in the axial direction, the protrusions 41f also overlap each other in the axial direction. Then, the protrusions 41f are fixed to each other in the axial direction using the protrusion caulking portions 41i formed in the central portions of the wide width portions 412f. Then, a protrusion lamination 41j formed by laminating the protrusions 41f is extracted radially outward to manufacture the rotor core 40.

Figure 8:
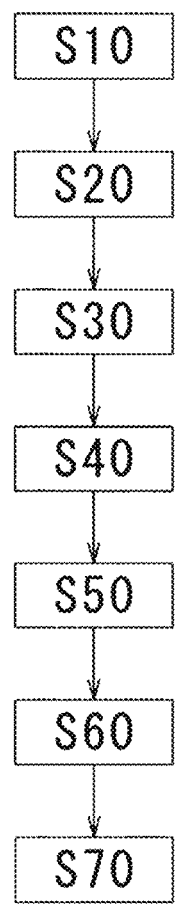
FIG. 8 is a flowchart illustrating a rotor core manufacturing method of a first example embodiment according to the present disclosure.

The method of manufacturing the above-described rotor core will be described in detail with reference to the accompanying drawings. FIG. 8 is a flowchart illustrating a rotor core manufacturing method of a first example embodiment according to the present disclosure. FIGS. 9 to 19 are views illustrating a part of each step in the method of manufacturing the rotor core illustrated in FIG. 8. Further, in the method of manufacturing the rotor core, from now on, solid lines indicate boundaries to be processed. For example, in the case of performing press working, solid lines are lines indicating a position at which a press working tool is to be placed. Also, in FIGS. 9 and 11, outer diameters of the first laminated steel plates 41 are indicated by broken lines in order to facilitate understanding.

As illustrated in FIG. 8, the method of manufacturing the rotor core according to the present example embodiment includes a caulking portion forming step S10, a removal margin forming step S20, a laminated steel plate forming step S30, a laminating step S40, a fixing step S50, a removing step S60, and a resin filling step S70.

Figure 9:
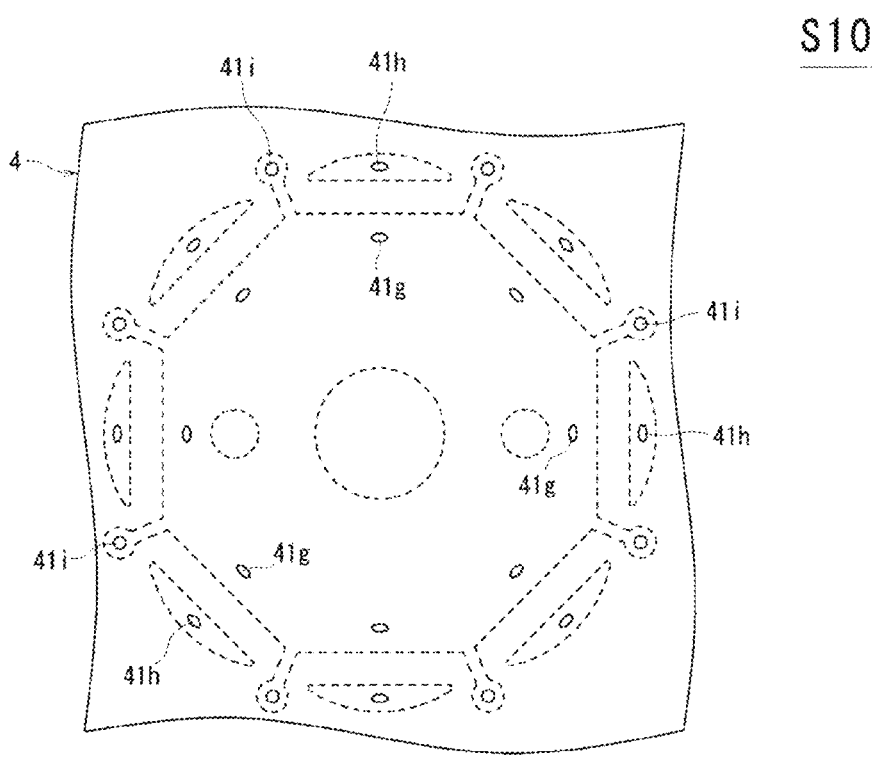
FIG. 9 is a view illustrating a part of a caulking portion forming step according to an example embodiment of the present disclosure.

FIG. 9 is a view illustrating a part of the caulking portion forming step. As illustrated in FIG. 9, base caulking portions 41g, piece caulking portions 41h, and protrusion caulking portions 41i are formed on a work piece 4, which is an electronic steel plate formed of a magnetic material. Further, the base caulking portion 41g is formed in the vicinity of the center of each side of a portion which is to be the first base portion 41a. The piece caulking portion 41h is formed at the center of each portion which is to be the flake portion 41c. The protrusion caulking portion 41i is formed at the center of each portion which is to be the wide width portion 412f.

Figure 10:
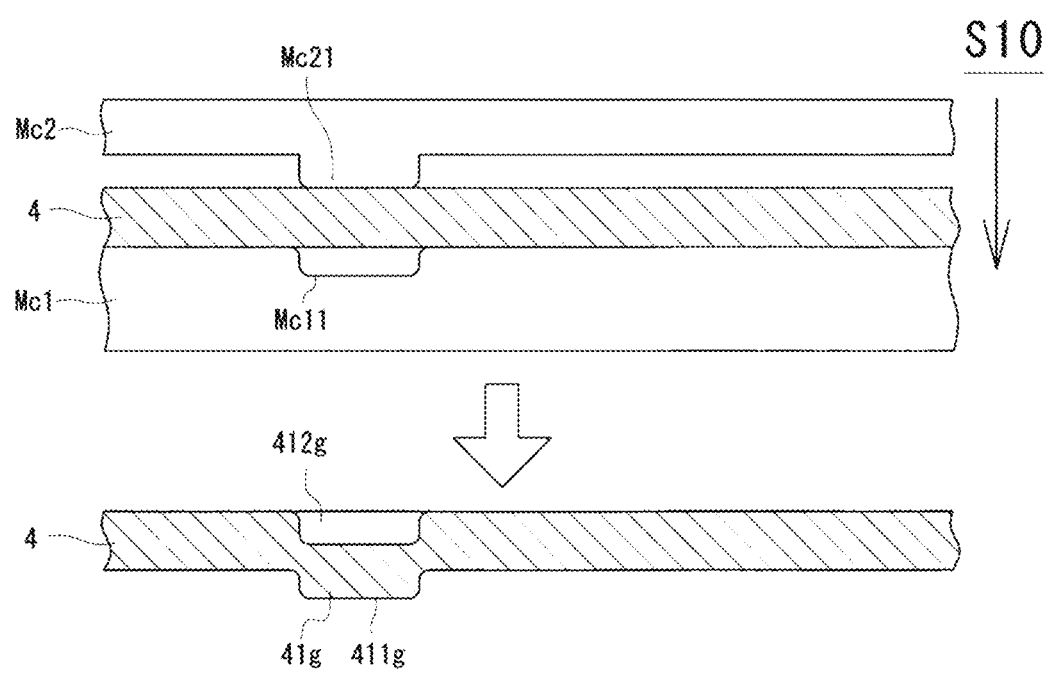
FIG. 10 is a view illustrating a process of forming a base caulking portion according to an example embodiment of the present disclosure.

The method of forming the caulking portion will be described by taking the base caulking portion 41g as an example. FIG. 10 is a view illustrating a process of forming the base caulking portion. In FIG. 10, the work piece 4 is cross-hatched. As illustrated in FIG. 10, in the caulking portion forming step S10, a lower caulking mold Mc1 is brought into contact with a lower surface of the work piece 4. Then, an upper caulking mold Mc2 is brought into contact with an upper surface of the work piece 4. A concave portion Mc11 having a bottom concave downward is provided at an upper surface of the lower caulking mold Mc1. Also, the upper caulking mold Mc2 includes a caulking convex portion Mc21 protruding downward from a lower surface.

In the caulking portion forming step S10, the concave portion Mc11 is vertically overlapped with a portion where the base caulking portion 41g is to be formed, and the lower caulking mold Mc1 is brought into contact with a bottom surface of the work piece 4. Then, the caulking convex portion Mc21 is vertically overlapped with the concave portion Mc11 to press the upper caulking mold Mc2 against the work piece 4. The work piece 4 is pushed by the caulking convex portion Mc21 and extruded to the concave portion Mc11. Consequently, the base caulking portion 41g, which includes a convex portion 411g protruding downward and a caulking concave portion 412g formed at an upper surface and concave downward, is formed. Further, although the base caulking portion 41g is formed here, the piece caulking portion 41h and the protrusion caulking portion 41i are also similarly formed.

Further, the base caulking portion 41g and the piece caulking portion 41h remain on the first laminated steel plate 41 even after the first laminated steel plate 41 is formed. Then, as illustrated in FIG. 10, the base caulking portion 41g and the piece caulking portion 41h protrude to the other side in the axial direction more than the other portions of the first laminated steel plate 41. It is desirable that the base caulking portion 41g and the piece caulking portion 41h be as small as possible.

After the caulking portion is formed in the caulking portion forming step S10, the removal margin forming step S20 of forming the removal margin 411a is performed. The removal margin 411a is removed together with the protrusion 41f from the first base portion 41a when the protrusion 41f is extracted. In other words, the removal margin 411a is connected to the first base portion 41a until the protrusion 41f is extracted. For that reason, a push back process is formed in the removal margin forming step S20 of forming the removal margin 411a. Also, the removal margin 411a is extracted together with the protrusion 41f, and both are formed from the work piece 4. For that reason, the removal margin 411a can be said to be a part of the protrusion 41f as well as a part of the first base portion 41a.

Figure 11:
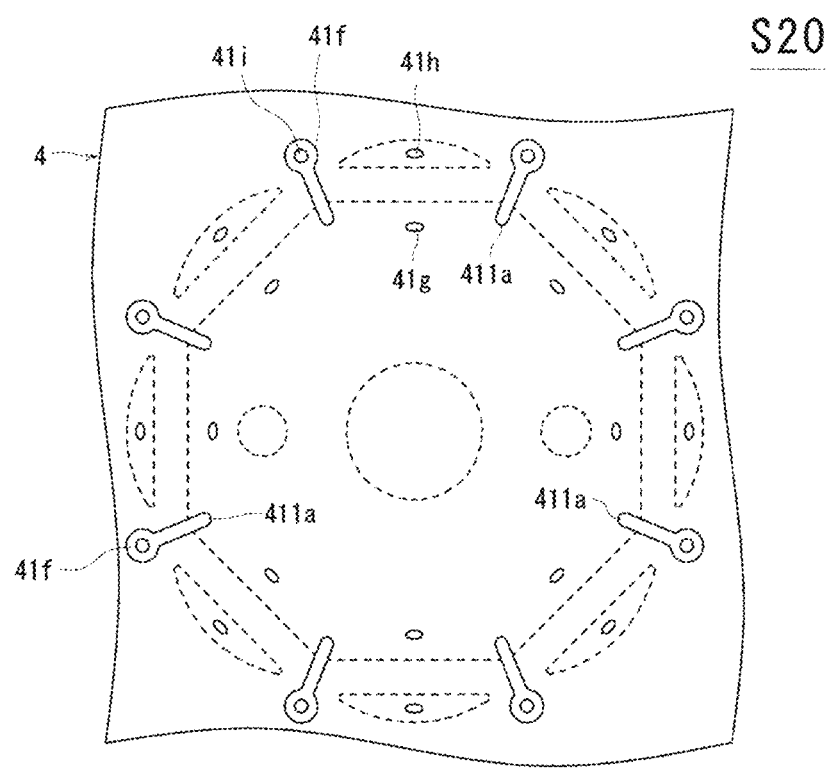
FIG. 11 is a view illustrating a part of a removal margin forming step according to an example embodiment of the present disclosure.
Figure 12:
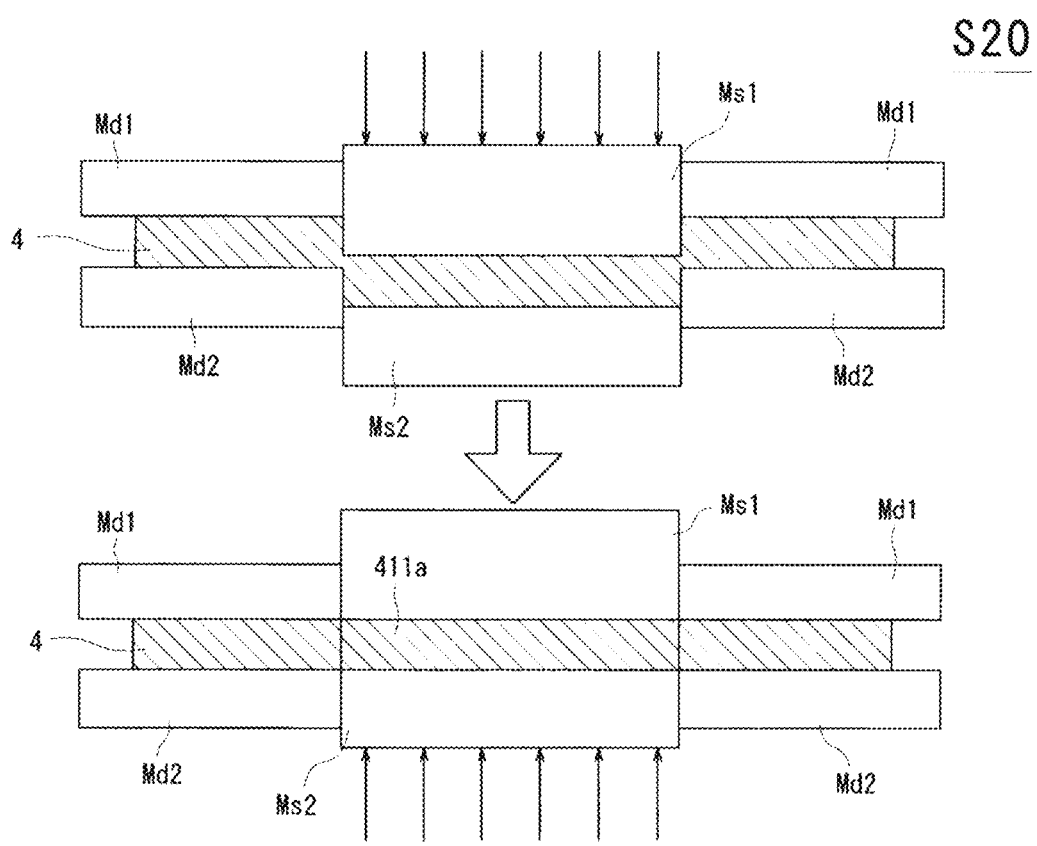
FIG. 12 is a view illustrating a push back process performed by the removal margin step according to an example embodiment of the present disclosure.

FIG. 11 is a view illustrating a part of the removal margin forming step. FIG. 12 is a view illustrating a push back process performed by the removal margin step. In FIG. 12, the work piece 4 is hatched.

As illustrated in FIG. 12, the upper surface and the lower surface of the work piece 4 are sandwiched between push back molds Md1 and Md2. The push back mold Md1 comes into contact with the upper surface of the work piece 4. The push back mold Md1 includes a pressing tool Ms1 which is movable up and down. Also, the push back mold Md2 comes into contact with the lower surface of the work piece 4. A pressing tool Ms2 which vertically faces the pressing tool Ms1 and is movable up and down is provided in the push back mold Md2. Then, the pressing tool Ms1 is moved downward in a state in which the work piece 4 is sandwiched between the push back molds Md1 and Md2.

The removal margin 411a and the protrusion 41f are extruded downward. Then, before the removal margin 411a and the protrusion 41f are completely separated from the work piece 4, the pressing tool Ms1 is stopped. Thereafter, the pressing tool Md2 is moved upward to return the extruded portions to their original positions. By the push back process, the removal margin 411a reaches a cut state leaving a portion in a thickness direction of the work piece 4. Also, when the removal margin 411a is formed, the relative positions of the protrusion 41f and the first base portion 41a are moved to the positions before machining. That is, in the removal margin forming step, the push back process in which the removal margin 411a is extruded in the axial direction by a predetermined amount or more and then pushed back to its original position is performed.

By performing the push back process, a strength of a boundary portion of the removal margin 411a is reduced as compared to the other portions of the work piece 4. Consequently, when the protrusion 41f is extracted radially outward, the removal margin 411a is removed together with the protrusion 41f such that it is easy to form the concave portion 41e. Further, although a portion of the removal margin 411a is left in the thickness direction of the work piece 4 and returned to its original position in the push back process of the present example embodiment, the removal margin 411a may also be returned to its original position after being completely extruded in the thickness direction of the work piece 4. Even in the case in which the removal margin 411a is completely extruded, depending on the shape of the end face of the extruded portion, it is possible to stop the pushed-back portion at its original position.

That is, the removal margin forming step S20 is performed before the laminating process S40 and forms the removal margin 411a that is removed together with the protrusion 41f, which is removed in the removing step S60, in a state in which the relative positions of the protrusion 41f and the first base portion 41a are maintained by cutting all or a part of a radially inner end of the protrusion 41f.

Further, the removal margin forming step S20 is a step of forming the removal margin 411a that is removed together with the protrusion 41f when the protrusion 41f is extracted in the radial direction in the removing step S60. Other than the push back process, a machining method capable of forming the removal margin 411a which is removed together with the protrusion 41f upon extraction of the protrusion 41f may be adopted, for example, a cutting process or the like.

The laminated steel plate forming step S30 of forming the first laminated steel plate 41 is performed on the work piece 4 on which the removal margin 411a is formed in the removal margin forming step S20. In the laminated steel plate forming step S30, a tool (not shown) is brought into contact with a portion (indicated by broken lines in FIG. 10) which is to be the first laminated steel plate 41 of the work piece 4, and punching is performed by press working to form the first laminated steel plate 41. At this time, the removal margin 411a is not punched. For that reason, the first laminated steel plate 41 formed in the laminated steel plate forming step S30 is formed in a state in which the removal margin 411a and the protrusion 41f are connected to the first base portion 41a (see FIG. 6).

Figure 13:
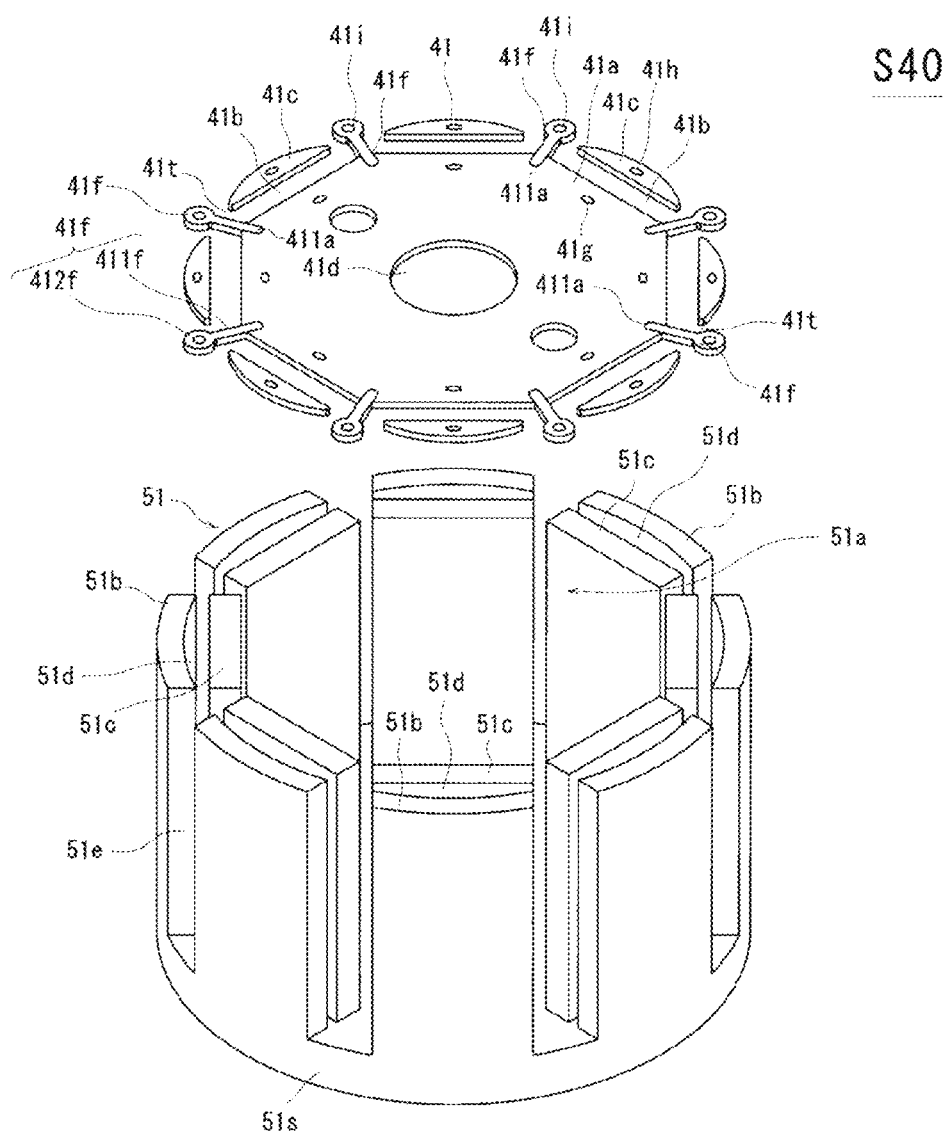
FIG. 13 is a perspective view illustrating a part of a laminating step according to an example embodiment of the present disclosure.

The first laminated steel plates 41 formed in the laminated steel plate forming step S30 are sequentially inserted into the lamination mold 51 and laminated. FIG. 13 is a perspective view illustrating a part of the laminating step. First, the lamination mold 51 will be described. As illustrated in FIG. 13, the lamination mold 51 has a bottom portion 51s, a base portion accommodating space 51a, an outer side pressing portion 51b, an inner side pressing portion 51c, a flake portion accommodating space 51d, and a slit 51e.

The bottom portion 51s has a disk shape. The first laminated steel plate 41 is disposed on an upper surface of the bottom portion 51s. The outer side pressing portion 51b extends upward in the axial direction from a side edge portion of the bottom portion 51s. The outer side pressing portion 51b has a shape formed by cutting a cylinder extending in the axial direction in the circumferential direction. Eight outer side pressing portions 51b are provided, and the outer side pressing portions 51b are arranged in the circumferential direction at equal intervals. The slit 51e is provided between the outer side pressing portions 51b adjacent in the circumferential direction. In the removing step S60, the protrusion lamination 41j is extracted from the slit 51e (see FIGS. 15 and 16 which will be described below).

The inner side pressing portion 51c is disposed to face an inner side surface of the outer side pressing portion 51b. The number of inner side pressing portions 51c provided is the same as the number of outer side pressing portions 51b, that is, eight. The inner side pressing portion 51c has a rectangular parallelepiped shape extending in the axial direction. The inner side pressing portion 51c has substantially the same size as the magnet 32. The eight inner side pressing portions 51c are disposed at equal intervals around the central axis. A region surrounded by the inner side pressing portions 51c has an octagonal shape when viewed in the axial direction and is the base portion accommodating space 51a configured to accommodate the first base portion 41a. Further, an inner side surface of the inner side pressing portion 51c is formed slightly larger than the first base portion 41a. That is, when the first base portion 41a is accommodated in the base portion accommodating space 51a, a small gap is formed between the inner side surface of the inner side pressing portion 51c and the first base portion 41a.

The slit 51e is a groove extending toward the bottom portion 51s from an upper end in the axial direction and passing through in the radial direction. Then, when the first base portion 41a is accommodated in the base portion accommodating space 51a, a portion of the wide width portion 412f of the protrusion 41f is located in the slit 51e. In other words, when the first base portions 41a are laminated in the axial direction, the portion of the wide width portion 412f moves into the slit 51e. The slit 51e is also an insertion portion into which the extracting tool Gd is inserted when the protrusion lamination 41j is extracted in the radial direction. Also, by positioning a portion of the protrusion 41f in the slit 51e, the protrusion 41f can be pushed radially inward from the outside of the lamination mold 51. Then, the protrusions 41f are arranged at equal angular intervals around the central axis. For that reason, by pushing the protrusion 41f in the radial direction, it is possible to easily adjust a position of the first base portion 41a accommodated in the base portion accommodating space 51a, that is, position the first base portion 41a relative to the base portion accommodating space 51a.

The flake portion accommodating space 51d is formed between a radially inner side surface of the outer side pressing portion 51b and a radially outer side surface of the inner side pressing portion 51c. The radially inner side surface of the outer side pressing portion 51b is a curved surface formed by cutting an inner circumferential surface of a cylinder in the circumferential direction. The radially outer side surface of the inner side pressing portion 51c is flat. From this, a radial length of the flake portion accommodating space 51d is longest at the center in the circumferential direction and gradually shortens toward both ends in the circumferential direction.

Then, in the laminated state, the radial length of the flake portion 41c is longest at the center in the circumferential direction and gradually shortens toward both ends in the circumferential direction. Then, a radius of curvature of a radially outer side of the flake portion 41c is smaller than a radius of curvature of the radially inner side surface of the outer side pressing portion 51b. The radial length of the flake portion accommodating space 51d at the center in the circumferential direction is made equal to the radial length of the flake portion 41c at the center in the circumferential direction. Consequently, the flake portion 41c is positioned in the flake portion accommodating space 51d. Further, the radial length of the flake portion accommodating space 51d may be formed slightly longer than the radial length of the flake portion 41c in consideration of the ease of accommodating the flake portion 41c. Also, the radius of curvature of the radially outer side of the flake portion 41c may be equal to the radius of curvature of the radially inner side surface of the outer side pressing portion 51b.

The first laminated steel plates 41 are inserted into the lamination mold 51 and laminated. At this time, the first base portion 41a is accommodated in the base portion accommodating space 51a. Also, the flake portion 41c is accommodated in the flake portion accommodating space 51d. The above-described lamination mold 51 is an example, and the lamination mold is not limited thereto. As the lamination mold, any mold having a configuration in which each of the first base portions 41a, the flake portions 41c, and the protrusions 41f can be overlapped in the axial direction may be widely adopted.

Figure 14:
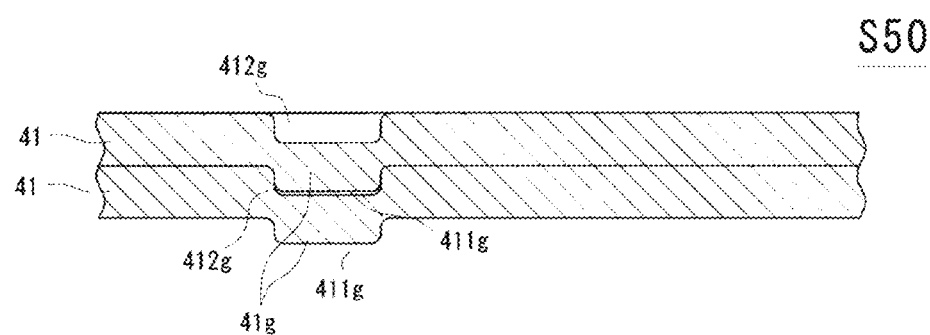
FIG. 14 is a view illustrating a fixing process in the fixing step according to an example embodiment of the present disclosure.

FIG. 14 is a view illustrating a fixing process in the fixing step. In FIG. 14, the base caulking portion 41g is shown as a representative of the base caulking portion 41g, the piece caulking portion 41h, and the protrusion caulking portion 41i. As illustrated in FIG. 14, the caulking convex portion 411g of the first base portion 41a laminated on the caulking concave portion 412g of the first base portion 41a therebelow in the axial direction is inserted and fixed into the caulking concave portion 412g. Inserting and fixing the caulking convex portion 411g, which is laminated on the caulking concave portion 412g of the first base portion 41a therebelow, to the caulking concave portion 412g may be referred to as "caulking process" or simply "caulking" in some cases. In the case in which the caulking process is performed, the caulking process is performed by pressing the first base portion 41a at an upper portion against the first base portion 41a at a lower portion using a pressing tool (not illustrated). Further, the caulking of the flake portions 41c by the piece caulking portion 41h and the caulking of the protrusions 41f by the protrusion caulking portion 41i are similarly performed by pressing from above using a tool.

By forming the base caulking portion 41g, the piece caulking portion 41h, and the protrusion caulking portion 41i in advance in each portion of the first laminated steel plate 41, the caulking process after the lamination is facilitated. Further, regarding the laminating step and the fixing step, all of the first laminated steel plates 41 may be laminated in the laminating step, and then the fixing step for caulking all of the first laminated steel plates 41 may be performed. Also, the fixing step may be performed each time one first laminated steel plate 41 is laminated. Further, in the fixing step, the process of caulking the first base portion 41a, the process of caulking the flake portion 41c, and the process of caulking the protrusion 41f may be performed simultaneously. Also, in the fixing step, a base portion fixing step of fixing (caulking) the first base portions 41a laminated in the axial direction, a flake portion fixing step of fixing (caulking) the flake portions 41c laminated in the axial direction, and a protrusion fixing step of fixing (caulking) the protrusions 41f laminated in the axial direction may be performed separately.

Figure 15:
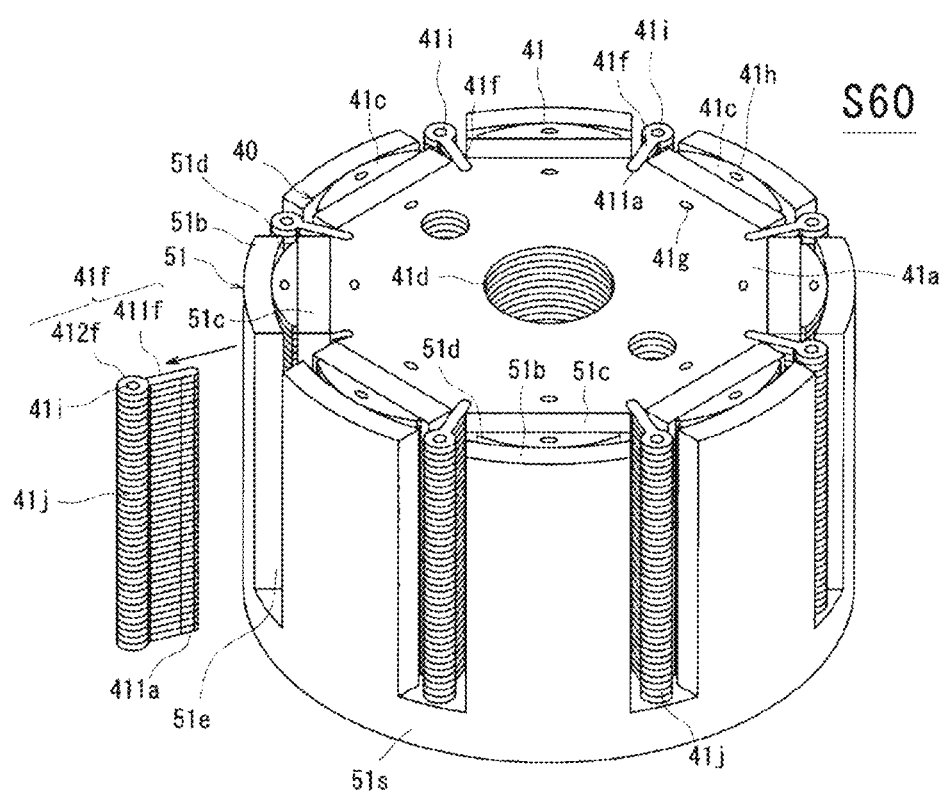
FIG. 15 is a view illustrating a removing step according to an example embodiment of the present disclosure.
Figure 16:
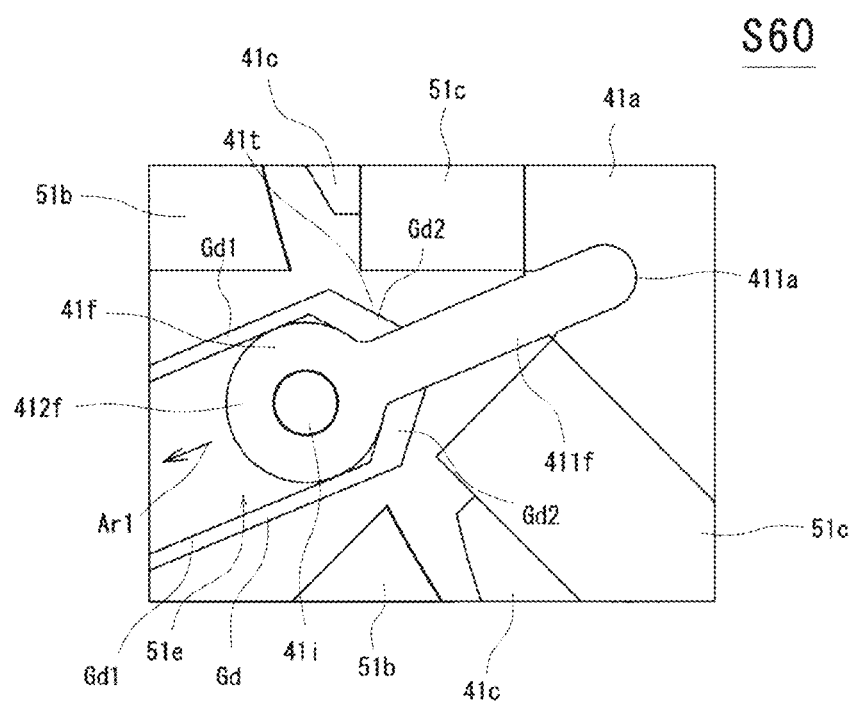
FIG. 16 is an enlarged view of the removing step illustrated in FIG. 15.

FIG. 15 is a view illustrating a removing step. FIG. 16 is an enlarged view of the removing step illustrated in FIG. 15. Further, in FIG. 16, a direction in which the protrusion 41f is removed in the removing step S60 is indicated by an arrow Ar1. The arrow Ar1 goes from the radially inner side to the outer side. As illustrated in FIG. 15, in the removing step S60, inside the lamination mold 51, the protrusion lamination 41j is extracted radially outward from the laminated first laminated steel plates 41 through the slit 51e therebetween. That is, in the removing step, the protrusions 41f of the first laminated steel plates 41 are removed radially outward.

At this time, since the boundary portion of the removal margin 411a is weaker than the other portions of the first base portion 41a, the removal margin 411a is removed together with the protrusion lamination 41j. After the removal margin 411a is removed together with the protrusion lamination 41j, the concave portion 41e which is concave radially inward is formed in the corner portion 41m of the first base portion 41a. That is, the concave portion 41e is formed to be directed radially inward from the outer side surface 41w of the first base portion 41a. The concave portions 41e formed by removing the removal margin 411a overlap each other in the axial direction.

In the case of performing the removing step, as illustrated in FIG. 16, the extracting tool Gd is inserted from the radially outer side of the slit 51e. The extracting tool Gd includes a pair of arms portion Gd1 and claw portions Gd2. The arm portion Gd1 extends in the radial direction from the lamination mold 51. The claw portion Gd2 is provided to face distal ends of the pair of arms portion Gd1. The extracting tool Gd causes the claw portion Gd2 to be inserted from the radially outer side of the slit 51e. The claw portion Gd2 is wrapped around the radially inner side of the wide width portion 412f of the protrusion 41f, and the connecting portion 411f is grasped in the circumferential direction. In this state, by pulling the protrusion 41f in the radial direction (in FIG. 16, the pulling direction is indicated by the arrow Ar1), the protrusion 41f and the removal margin 411a continuous with the radially inner side of the protrusion 41f are extracted. By forming the wide width portion 412f in the protrusion 41f, the claw portion Gd2 can be hooked thereon, and the extraction can be performed easily and reliably.

Further, the claw portions Gd2 may be long in the axial direction or may be provided at positions at which the claw portions Gd2 grasp the protrusion lamination 41j at a plurality of spots thereof in the axial direction. For example, in the case in which the claw portions Gd2 are configured to grasp the entire protrusion lamination 41j in the axial direction, it is possible to omit the fixing of the protrusions 41f in the fixing step. Also, in the case in which the fixing of the protrusions 41f is omitted, the forming of the protrusion caulking portion 41i is also omitted. However, by fixing the protrusions 41f to each other, scattering of the protrusions 41f after the protrusions 41f are removed is suppressed. For that reason, it is desirable that the protrusions 41f be fixed to each other in the fixing step.

Figure 17:
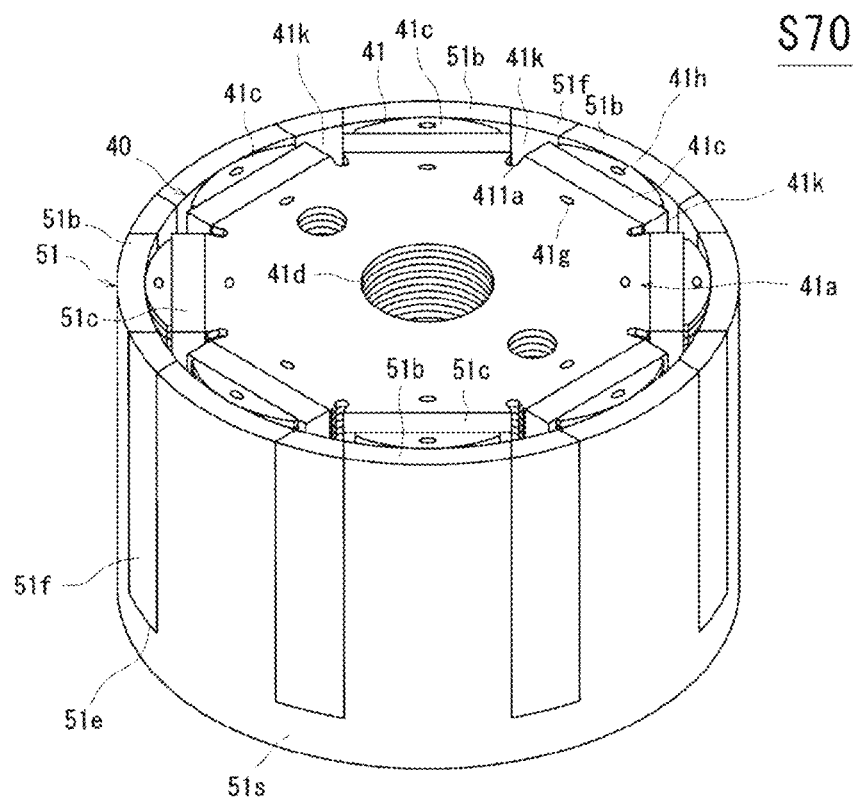
FIG. 17 is a top perspective view of a lamination mold according to an example embodiment of the present disclosure before a resin filling step is performed.
Figure 18:
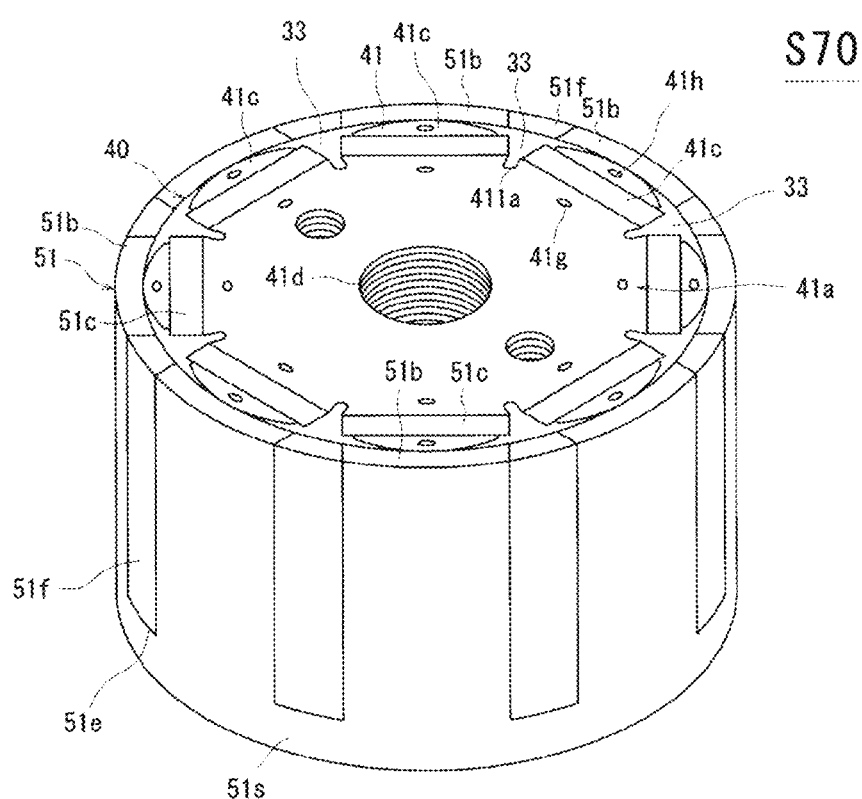
FIG. 18 is a top perspective view of the lamination mold after the resin filling step.
Figure 19:
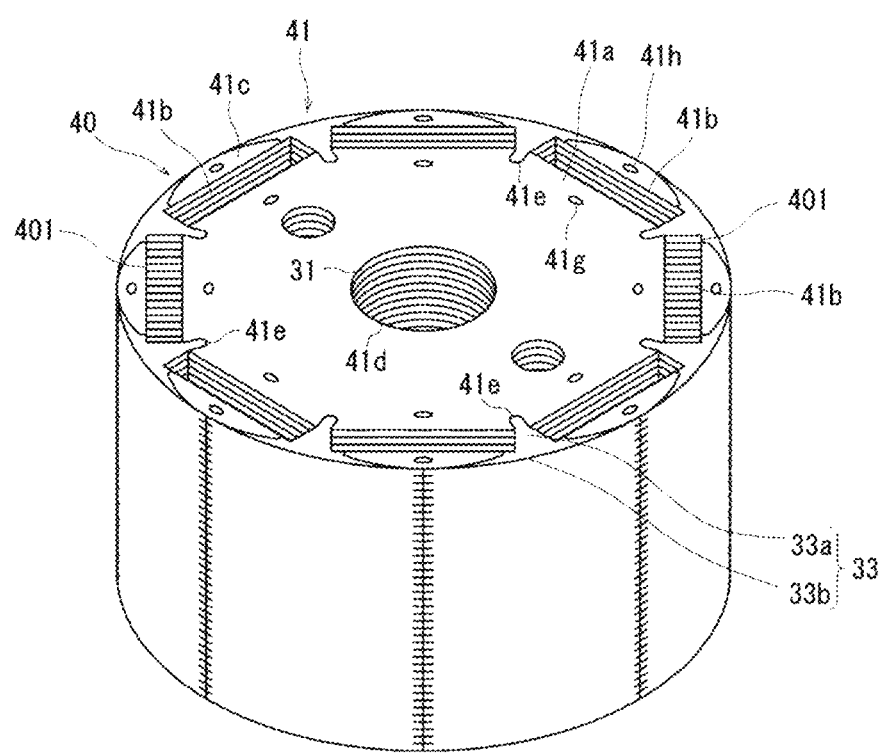
FIG. 19 is a top perspective view of a rotor core withdrawn from the mold after the resin filling step.

FIG. 17 is a top perspective view of a lamination mold before a resin filling step is performed. FIG. 18 is a top perspective view of the lamination mold after the resin filling step. FIG. 19 is a top perspective view of a rotor core withdrawn from the mold after the resin filling step.

By removing the protrusion lamination 41j in the removing step S60, the rotor core 40 illustrated in FIG. 3 is formed in the lamination mold 51. A space portion 41k is formed between the inner side pressing portions 51c adjacent in the circumferential direction. The inner side pressing portion 51c passes through the mounting hole 401 and corresponds to a spot where the magnet 32 of the rotor core 40 withdrawn from the lamination mold 51 is installed. That is, in the rotor core 40, the space portion 41k is formed between the magnets 32 adjacent in the circumferential direction.

Since the first base portion 41a and the flake portion 41c are spaced apart in the rotor core 40 illustrated in FIG. 3, it is difficult to withdraw the rotor core 41 as it is from the lamination mold 51. Thus, in the resin filling step S70, the space portion 41k between the lamination mold 51 and the rotor core 40 is filled with resin in order to fix the first base portion 41a and the flake portion 41c relative to each other.

As illustrated in FIG. 17, in the lamination mold 51, a closed portion 51f configured to close the slit 51e is detachably provided in the slit 51e. By installing the closed portion 51f in the slit 51e, the lamination mold 51 has a cylindrical or substantially cylindrical shape due to the outer side pressing portion 51b and the closed portion 51f. The resin portion 33 is formed by pouring resin into the space portion 41k, which is between the inner side pressing portions 51c adjacent in the circumferential direction, the concave portion 41e, and the gap 41t and curing the resin (FIG. 18). That is, the method further includes a filling step of filling the concave portion 41e, the gap 41t, and the space portion 41k with the filler (resin).

At this time, the resin is poured into the concave portion 41e. Consequently, a contact area between the resin portion 33 and the first base portion 41a increases, and it becomes possible to firmly fix the first base portion 41a and the flake portion 41c using the resin portion 33. The resin portion 33 also serves as a flux barrier. Further, although not illustrated, the filler may extend to the upper side or lower side of the magnet 32. That is, in the above-described filling step, the filler may further fill in the upper side or lower side of the magnet 32. At this time, the resin portion 33 desirably covers at least a portion of an upper end or a lower end of the magnet 32. Consequently, it is possible to prevent the magnet 32 from popping out in an upward or downward direction. Further, the filler does not necessarily cover the entire upper or lower end of the magnet, and a portion of the magnet may be exposed from a through-hole provided in the resin portion 33. By exposing a portion of the magnet from the resin portion 33, it is possible to check the misalignment of the magnet or visually check the filling amount of the resin from the outside during the filling step or after the filling step.

Further, although the filler used to fill is a resin here, the filler is not limited to the resin. Any material having fluidity at the time of construction and curing after completion of construction can be widely adopted. Further, in the case of using the resin, in the case in which the resin is a thermosetting resin, the resin may be fired in a firing apparatus (so-called over) together with the lamination mold 51. In the present example embodiment, since the resin is cured before the magnet 32, which is easily denatured by heat, is installed, it is possible to suppress a change in magnetic characteristics due to heat treatment.

After the resin used to fill in the resin filling step (S70) is cured, the rotor core 40 is withdrawn together with the resin portion 33 from the lamination mold 51 (see FIG. 19). In the rotor core 40 fixed by the resin portion 33, as described above, the gaps 41b of the first laminated steel plates 41 overlap each other in the axial direction such that the mounting hole 401 passing through in the axial direction is formed. Then, an inserting step in which the magnet 32 is inserted into the mounting hole 401 may be included. That is, an inserting step in which the magnets 32 are inserted into the mounting holes 401 of the plurality of first laminated steel plates 41 laminated in the laminating step may be included. Also, the shaft holes 41d of the first laminated steel plates 41 overlap each other in the axial direction, and the shaft 31 passes through the shaft holes 41d in the axial direction. Consequently, the rotor 3 is completed (see FIG. 2).

In the present example embodiment, in the rotor core 40, a flux barrier is formed by providing the space portion between the magnets 32 adjacent in the circumferential direction and pouring a resin in to the space portion to form the resin portion 33. Consequently, it is possible to improve magnetic characteristics of the rotor by suppressing the occurrence of a magnetic flux loop.

By using the method of manufacturing the rotor core according to the present disclosure, since the first base portion 41a may include the protrusions 41f when the first laminated steel plates 41 are laminated, handling, such as moving and positioning of the first base portion 41a, is easy. Also, since the protrusions 41f are removed after the first laminated steel plates 41 are laminated, when the magnets 32 are installed at the rotor core 40, steel plates at portions where the magnets 32 are adjacent in the circumferential direction are removed. The space is formed between the magnets 32 adjacent in the circumferential direction, and a resin is poured into the space to form the resin portion. Since the resin portion acts as a flux barrier, it is possible to suppress the occurrence of a magnetic flux loop and improve magnetic characteristics of the rotor 3. Also, since the protrusion 41f and the removal margin 411a are removed just by pulling the protrusion 41f in the radial direction, the machining process is simpler as compared with the case of scraping the protrusion 41f in the axial direction.

In the manufacturing steps, each step may be performed earlier or later within a possible range. For example, the removal margin forming step may be performed after the laminated steel plate forming step or before the caulking portion forming step as long as the removal margin forming step is performed before the laminating step.

A modified example of the present example embodiment will be described. In the above-described example embodiment, the removal margin 411a is formed, and the concave portion 41e that is concave radially inward is formed in the corner portion 41m of the first base portion 41a. However, when the magnet 32 is disposed, there may be a case in which a sufficient flux barrier can be formed or a case in which magnetic characteristics of the rotor 3 are at a certain level. In such cases, the concave portion 41e in the corner portion 41m of the first base portion 41a may also be omitted.

At this time, it is possible to omit the removal margin forming step S20 from the manufacturing steps. Further, in a case in which the removal margin is not formed, the protrusion 41f is pulled radially outward using the extracting tool Gd in the removing step S60. At this time, since a portion having a low strength (prone to breakage) is not formed, stress is concentrated at the boundary between the connecting portion 411f of the protrusion 41f and the first base portion 41a, and the portion of the boundary at which the stress is concentrated is broken. In this manner, the protrusion 41f is extracted by breaking the protrusion 41f in the extracting process. However, it is possible to form a portion with low strength (prone to breakage) at the boundary between the connecting portion 411f and the first base portion 41a using a process such as the removal margin forming step. By forming the portion with low strength (prone to breakage), it is possible to suppress a defect in which a breakage occurs in the middle of the protrusion 41f or in which only the wide width portion 412f is extracted.

In the above-described example embodiment, the resin filling step of using a resin to fill is performed in a state in which the first laminated steel plates 41 are laminated in the lamination mold 51. Example embodiments are not limited thereto, and, after the inner side pressing portion 51c is removed from the lamination mold 51 or the rotor core 40 is installed at a resin-filling mold, the resin may be used to fill after the magnet 32 is inserted into the mounting hole 401.

Another example of the rotor core according to the present disclosure will be described with reference to the accompanying drawings.

Figure 20:
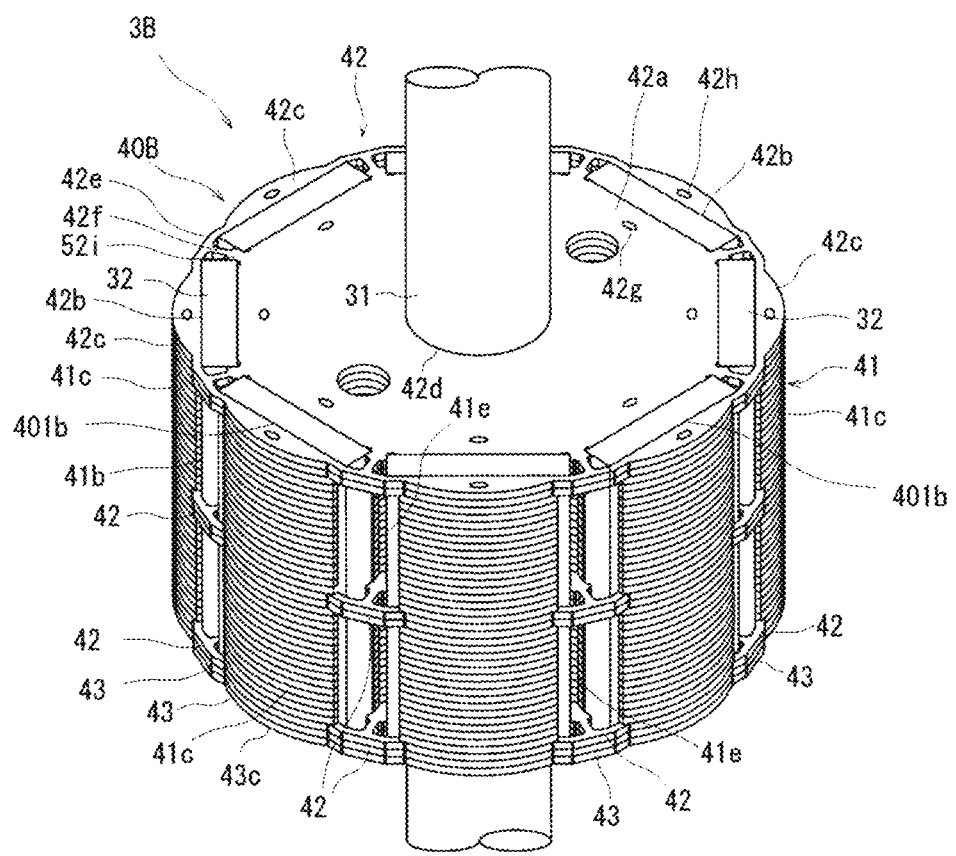
FIG. 20 is a top perspective view of a rotor of a motor according to a second example embodiment of the present disclosure.
Figure 21:
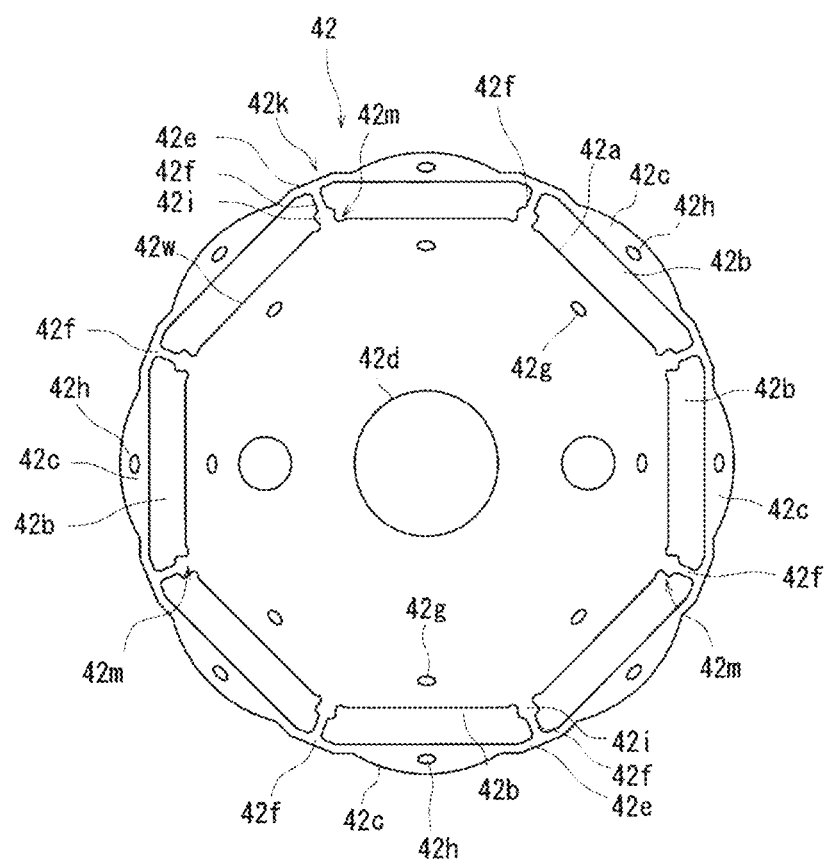
FIG. 21 is a plan view of a second laminated steel plate used in the rotor illustrated in FIG. 20.
Figure 22:
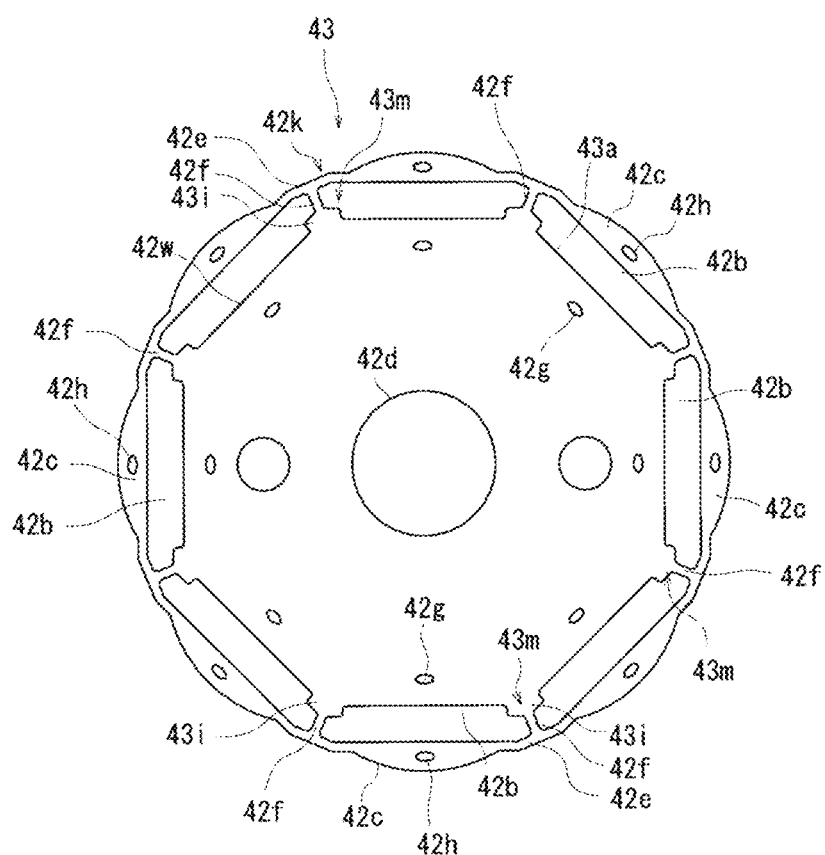
FIG. 22 is a plan view of a connecting laminated steel plate used in the rotor illustrated in FIG. 20.

A configuration of another example of the rotor core according to the present disclosure will be described. FIG. 20 is a top perspective view of a rotor of a motor according to a second example embodiment of the present disclosure. FIG. 21 is a plan view of a second laminated steel plate used in the rotor illustrated in FIG. 20. FIG. 22 is a plan view of a connecting laminated steel plate used in the rotor illustrated in FIG. 20. Further, in a rotor core 40B of the present example embodiment, in addition to the first laminated steel plate 41, a second laminated steel plate 42 and a connecting laminated steel plate 43 are used as the laminated steel plates. Then, a rotor 3B does not include the resin portion 33. The other portions have the same configuration as the rotor core 40 according to the first example embodiment. For that reason, in the configuration of the rotor core 40B, the same parts as those of the rotor core 40 are denoted by the same reference numerals. Also, in the configuration of the rotor 3B, the same parts as those of the rotor core 3 are denoted by the same reference numerals. Then, the detailed description of substantially the same parts will be omitted.

The rotor 3B illustrated in FIG. 20 has a shaft 31, a magnet 32, and the rotor core 40B. Then, the rotor core 40B has the first laminated steel plate 41, the second laminated steel plate 42, and the connecting laminated steel plate 43. Each of the first laminated steel plate 41, the second laminated steel plate 42, and the connecting laminated steel plate 43 expands in the radial direction from a central axis of the rotor core 40B. That is, the rotor core 40B has a configuration in which at least one second laminated steel plate 42 is laminated together with the first laminated steel plate 41. The rotor core 40B has mounting holes 401b which are arranged in the circumferential direction around the central axis and extend in the axial direction. The magnet 32 is attached in the mounting hole 401b.

The second laminated steel plate 42 illustrated in FIG. 21 includes a second base portion 42a and a flake portion 42c. The second base portion 42a is located radially outward from the central axis. An outer shape of the second base portion 42a is substantially octagonal shaped. Further, the outer shape of the second base portion 42a is not limited to being substantially octagonal shaped and may also be a circular shape or a polygonal shape such as being substantially hexagonal shaped, substantially dodecagonal shaped, or the like. The outer shape of the second base portion 42a is substantially the same as the outer shape of the first base portion 41a. The second base portion 42a has, at the center thereof in the radial direction, a shaft hole 42d through which the shaft 31 passes in the axial direction.

Also, the second base portion 42a includes, in the vicinity of the central portion of each side of the substantially octagonal shape, a base caulking portion 42g which protrudes from a lower surface and has a concave upper surface (see FIG. 10 described above). That is, the second base portion 42a includes eight base caulking portions 42g. Further, although the base caulking portion 42g has an elliptical shape when viewed from the axial direction in the present example embodiment, the shape of the base caulking portion 42g is not limited thereto and may also be a circular shape or a polygonal shape. Also, the number of base caulking portions 42g is not limited to eight, and although it is desirable to provide a plurality of base caulking portions 42g in order to enable stable fixing, the number of base caulking portions 42g may also be one. It is desirable that the base caulking portions 42g be provided at locations where a magnetic field generated by the magnet 32 is not easily disturbed when the magnet 32 is installed in the rotor core 40. When the first laminated steel plate 41 and the second laminated steel plate 42 are laminated, the base caulking portion 42g is formed in the shape and position that overlap the shape and position of the base caulking portion 41g in the axial direction.

The flake portion 42c is disposed to be spaced apart from the second base portion 42a on a radially outer side of the second base portion 42a with a though-hole 42b therebetween. A plurality of flake portions 42c are disposed in the circumferential direction at predetermined intervals. A plurality of flake portions 42c, for example, eight flake portions 42c, are respectively provided radially outside the sides at eight spots along the outer periphery of the second base portion 42a. Plan-view shapes of the flake portions 42c include a circular arc shape of which a center is misaligned radially outward from the central axis of the shaft 31 such that a radius is smaller than the radius of the rotor 3B and include a substantially semi-circular shape having a linear portion corresponding to a chord located radially inward from the circular arc shape. The radially inner linear portion of the flake portion 42c is nearly parallel to an outer side surface 42w of the second base portion 42a. Further, a circumferential length of the flake portion 42c is smaller than a circumferential length of the flake portion 41c. That is, the circumferential length of the flake portion 42c of the second laminated steel plate 42 is smaller than the circumferential length of the flake portion 41c of the first laminated steel plate 41.

A piece caulking portion 42h is formed at the center of each flake portion 42c. Although the piece caulking portion 42h has an elliptical shape when viewed from the axial direction, the shape of the piece caulking portion 42h is not limited thereto and may also be a circular shape or a polygonal shape. When the first laminated steel plate 41 and the second laminated steel plate 42 are laminated, the piece caulking portion 42h is formed in the shape and position that overlap the shape and position of the piece caulking portion 41h in the axial direction.

The second laminated steel plate 42 has a second connecting portion 42e configured to connect the flake portions 42c adjacent in the circumferential direction. By connecting the flake portions 42c adjacent in the circumferential direction to the second connecting portion 42e, an annular portion 42k is formed at a radially outer side of the second base portion 42a. In the annular portion 42k, the flake portions 42c and the second connecting portions 42e are alternately arranged. To secure a predetermined strength or more of the second connecting portion 42e, the second connecting portion 42e has a predetermined length in the radial direction. As described above, by changing the circumferential length of the flake portion, the connecting portion is not easily deformed even when a pressure is applied thereto in the axial direction.

From this, the portion where the radially outer side surface of the second connecting portion 42e and the radially outer side surface of the flake portion 42c are connected is closer to the center side of the flake portion 42c in the circumferential direction than the circumferential end of the flake portion 41c of the first laminated steel plate 41. That is, the circumferential length of the curved surface portion on the radially outer side of the flake portion 42c of the second laminated steel plate 42 is smaller than the circumferential length of the curved surface portion on the radially outer side of the flake portion 41c of the first laminated steel plate 41. That is, the circumferential length of the outer circumferential surface on the radially outer side of the flake portion 42c of the second laminated steel plate is smaller than the circumferential length of the outer circumferential surface on the radially outer side of the flake portion 41c of the first laminated steel plate 41.

Further, in the axial direction, the second connecting portion 42e is disposed at the same position as a region between the flake portions 41c adjacent in the circumferential direction of the first laminated steel plate 41.

The second laminated steel plate 42 has a first connecting portion 42f configured to connect the second base portion 42a and the flake portion 42c. That is, the second laminated steel plate 42 has the base portion 42a, the flake portion 42c, and the first connecting portion 42f configured to connect the base portion 42a and the flake portion 42c. More specifically, a convex portion 42i protruding radially outward is provided at a corner portion 42*m* of the second base portion 42*a*, and the first connecting portion 42*f* connects a distal end on the radially outer side of the convex portion 42*i* and an inner edge portion of the second connecting portion 42*e*. In the second base portion 42*a*, the first connecting portion 42*f* is disposed in a region between the second base portion 42*a* and the annular portion 42*k* in the radial direction. The first connecting portion 42*f* is disposed in a region between the through-holes 42*b* adjacent in the circumferential direction. A plan view shape of the first connecting portion 42*f* is the shape of a long plate extending in the radial direction. Also, since the circumferential width of the first connecting portion 42*f* is narrower than that of the convex portion 42*i*, it is possible to improve magnetic characteristics by forming a flux barrier.

The second connecting portion 42*e* has the shape of a long plate extending in the circumferential direction, and the first connecting portion 42*f* has the shape of a long plate extending in the radial direction. Then, a distal end of the first connecting portion 42*f* is connected to a central portion of the second connecting portion 42*e*, and the second connecting portion 42*e* and the first connecting portion 42*f* have a T-shape in plan view. Furthermore, when the magnets 32 are attached to the mounting holes 401*b* as illustrated in FIG. 20, portions surrounded by the radially inner side of the second connecting portion 42*e* and the surfaces facing the first connecting portion 42*f* and the magnets 32 are spaces, and the spaces become flux barriers.

The connecting laminated steel plate 43 illustrated in FIG. 22 includes a connecting base portion 43*a* and a flake portion 43*c*. The flake portion 43*c* is disposed to be spaced apart from the connecting base portion 43*a* on a radially outer side of the connecting base portion 43*a* with a though-hole 43*b* therebetween. The connecting laminated steel plate 43 is formed such that a circumferential width of a convex portion 43*i* provided at a corner portion 43*m* of the connecting base portion 43*a* is larger than the width of the convex portion 42*i* of the second laminated steel plate 42. The other portions have the same configuration as the second laminated steel plate 42. Substantially the same parts will be denoted by the same reference numerals, and detailed description thereof will be omitted.

The connecting base portion 43*a* is located radially outward from the central axis. An outer shape of the connecting base portion 43*a* is substantially octagonal shaped. The outer shape of the connecting base portion 43*a* is substantially the same as the outer shapes of the first base portion 41*a* and the second base portion 42*a*. The circumferential length of the convex portion 43*i* is larger than that of the convex portion 42*i* of the second base portion 42*a*. Consequently, it is possible to suppress the magnet from popping out in a downward direction.

As illustrated in FIG. 20, in the rotor core 40B, for example, a single connecting laminated steel plate 43 is disposed at a lower end in the axial direction. Then, in the rotor core 40B, two second laminated steel plates 42 are laminated on the connecting laminated steel plate 43 in the axial direction. Then, two second laminated steel plates 42 are also laminated on each of a middle portion and an axially upper end of the rotor core 40B. That is, in the rotor core 40B, the two second laminated steel plates 42 are laminated on each of the lower end, the middle portion, and the upper end in the axial direction. Then, a plurality of (here, sixteen) first laminated steel plates 41 are laminated between the second laminated steel plates 42 which are laminated separately from each other. That is, in the rotor core 40B, the second laminated steel plate 42 is disposed at least at one end in the axial direction. Further, the combination of the second laminated steel plates 42 is not limited to the illustrated structure. For example, two second laminated steel plates 42, one second laminated steel plate 42, and two second laminated steel plates 42 may be laminated at the lower end, the middle portion, and the upper end, respectively, in the axial direction. Also, it is desirable to further include the connecting laminated steel plate 43 at the lower side in the axial direction. Also, the rotor core including the second laminated steel plates 42 and the connecting laminated steel plate 43 may be further filled with a filler. Consequently, since fixing is performed by the filler as well as the connecting laminated steel plate, the fixing strength can be improved. Also, when the filler is used to fill, the filler can be used to fill without causing the flake portion and the base portion to come apart.

That is, the plurality of first laminated steel plates 41 are laminated between the upper second laminated steel plate 42 at the lower end in the axial direction and the lower second laminated steel plate 42 at the middle portion in the axial direction. Also, the plurality of first laminated steel plates 41 are laminated between the lower second laminated steel plate 42 at the upper end in the axial direction and the upper second laminated steel plate 42 at the middle portion in the axial direction. That is, the rotor core 40B has a configuration in which two or more second laminated steel plates 42 are included and the plurality of first laminated steel plates 41 are laminated between the second laminated steel plates 42.

As illustrated in FIG. 20, in the rotor core 40B, the flake portion 41*c* of the first laminated steel plate 41, the flake portion 42*c* of the second laminated steel plate 42, and the flake portion 42*c* of the connecting laminated steel plate 43 overlap in the axial direction, and the first laminated steel plate 41, the second laminated steel plate 42, and the connecting laminated steel plate 43 are laminated at a position where portions of the outer edge portions thereof meet. Then, the base portions and the flake portions are fixed by the caulking process.

In the rotor core 40B, the through-holes 42*b* of the second laminated steel plates 42 overlap the gaps 41*b* of the first laminated steel plates 41 in the axial direction and form the mounting holes 401*b* extending in the axial direction. The rotor core 40B includes the mounting holes 401*b* disposed at eight spots. Also, then, one magnet 32 is provided for each of the mounting holes 401*b* at the eight spots (see FIG. 20).

According to this configuration, the second laminated steel plates 42 in which the second base portion 42*a* and the flake portion 42*c* are connected via the first connecting portion 42*f* and the second connecting portion 42*e* are laminated at the both ends and the middle portion of the rotor core 40B in the axial direction. Consequently, even when the resin or the like is not used to fill, it is possible to suppress the first base portion 41*a* and the flake portion 41*c* of the rotor core 40B from coming apart.

Further, the above-described rotor core 40B has a configuration in which laminated cores in which the second laminated steel plates 42 are laminated on both ends in the axial direction overlap in the axial direction. Also, the number of first laminated steel plates 41 between the second laminated steel plates 42 may be the same or different. Also, the upper laminated core and the lower laminated core may be provided so as to be axially rotated at a predetermined angle.

Figure 23:
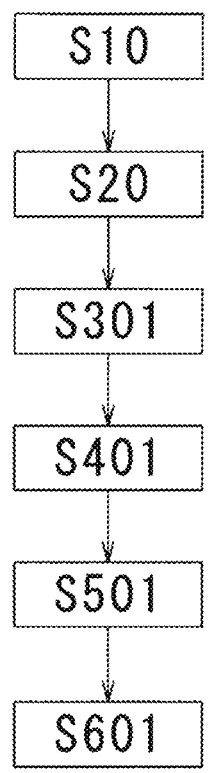
FIG. 23 is a view illustrating a part of a slot punching step of a method of manufacturing a laminated core illustrated in FIG. 22.

The method of manufacturing the above-described rotor core will be described in detail with reference to the accompanying drawings. FIG. 23 is a flowchart illustrating a method of manufacturing the rotor core according to the second example embodiment of the present disclosure. FIGS. 24 to 28 are views illustrating a part of each step in the method of manufacturing the rotor core illustrated in FIG. 23.

As illustrated in FIG. 23, the method of manufacturing the rotor core according to the present example embodiment includes a caulking portion forming step S10, a removal margin forming step S20, a laminated steel plate forming step S301, a laminating step S401, a fixing step S501, and a removing step S601. Since the caulking portion forming step S10 and the removal margin forming step S20 are the same as those among the steps of manufacturing the rotor core according to the first example embodiment, detailed description thereof will be omitted.

In the laminated steel plate forming step S301, laminated steel plates required to manufacture the rotor core 40B are formed. By performing press working on a work piece, the first laminated steel plate 41 (see FIG. 6), the second laminated steel plate 42 (see FIG. 21), and the connecting laminated steel plate 43 (see FIG. 22) are created.

Figure 24:
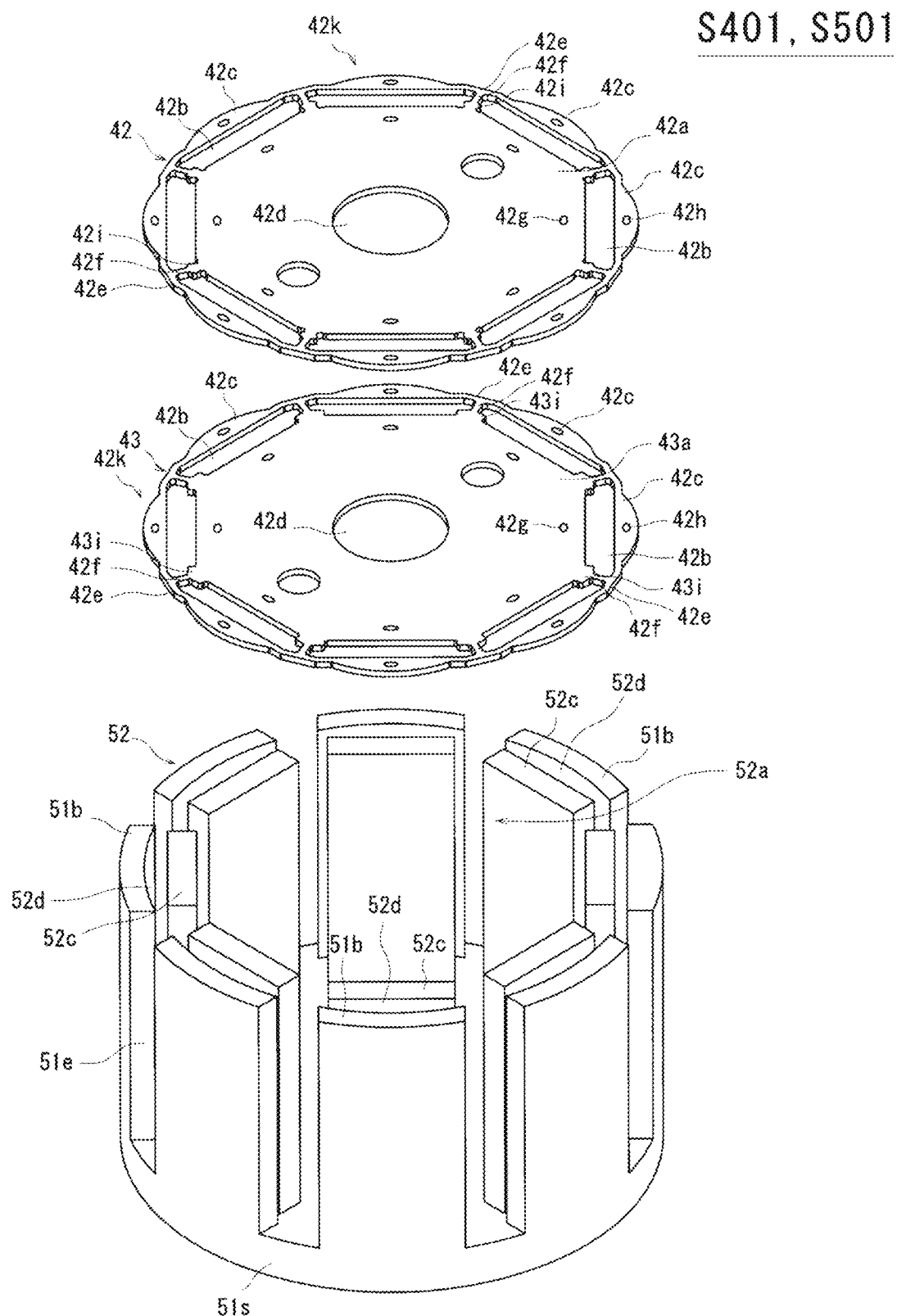
FIG. 24 is a perspective view illustrating a part of a laminating step according to an example embodiment of the present disclosure.
Figure 25:
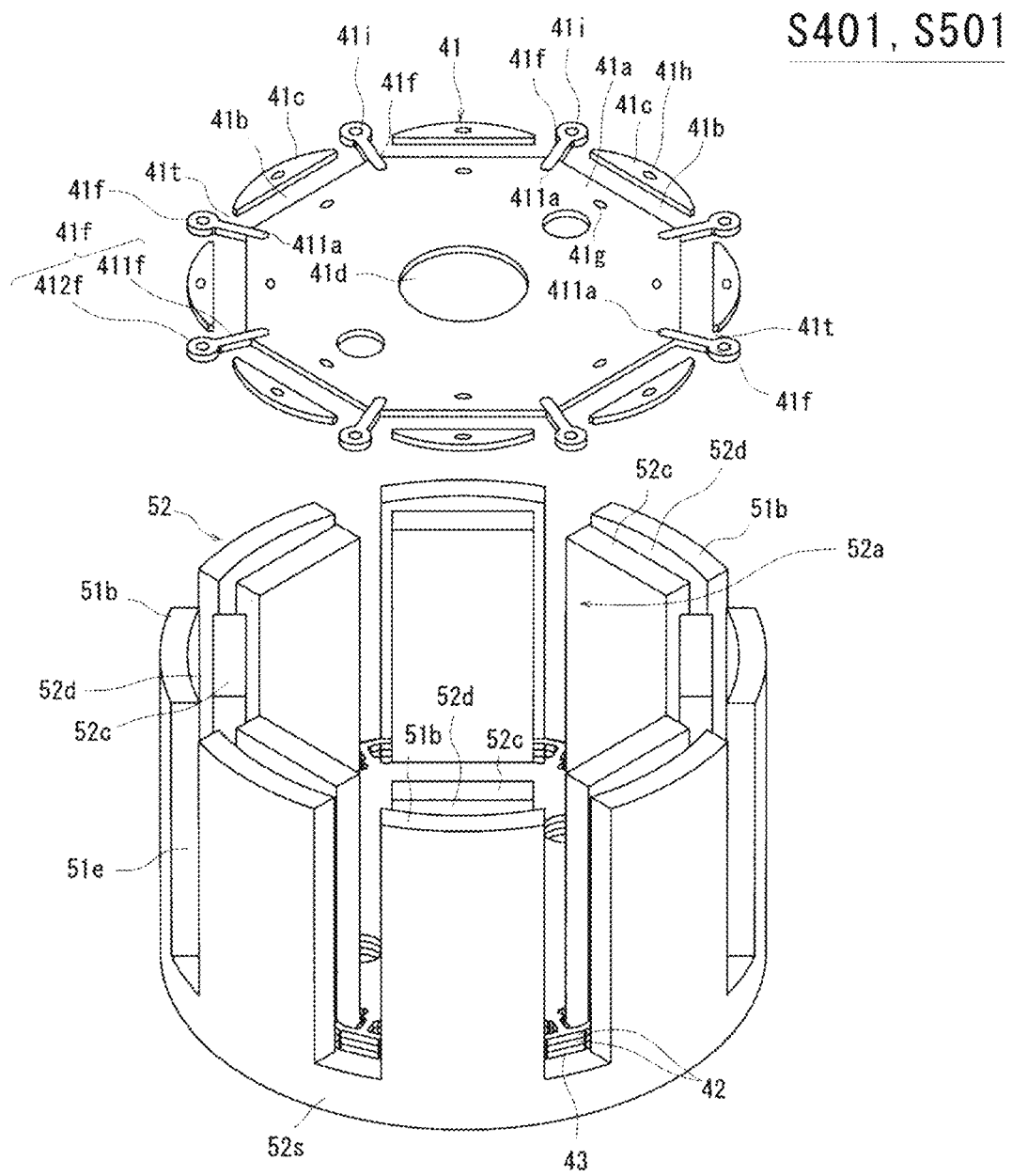
FIG. 25 is a perspective view illustrating a part of the laminating step performed after FIG. 24.
Figure 26:
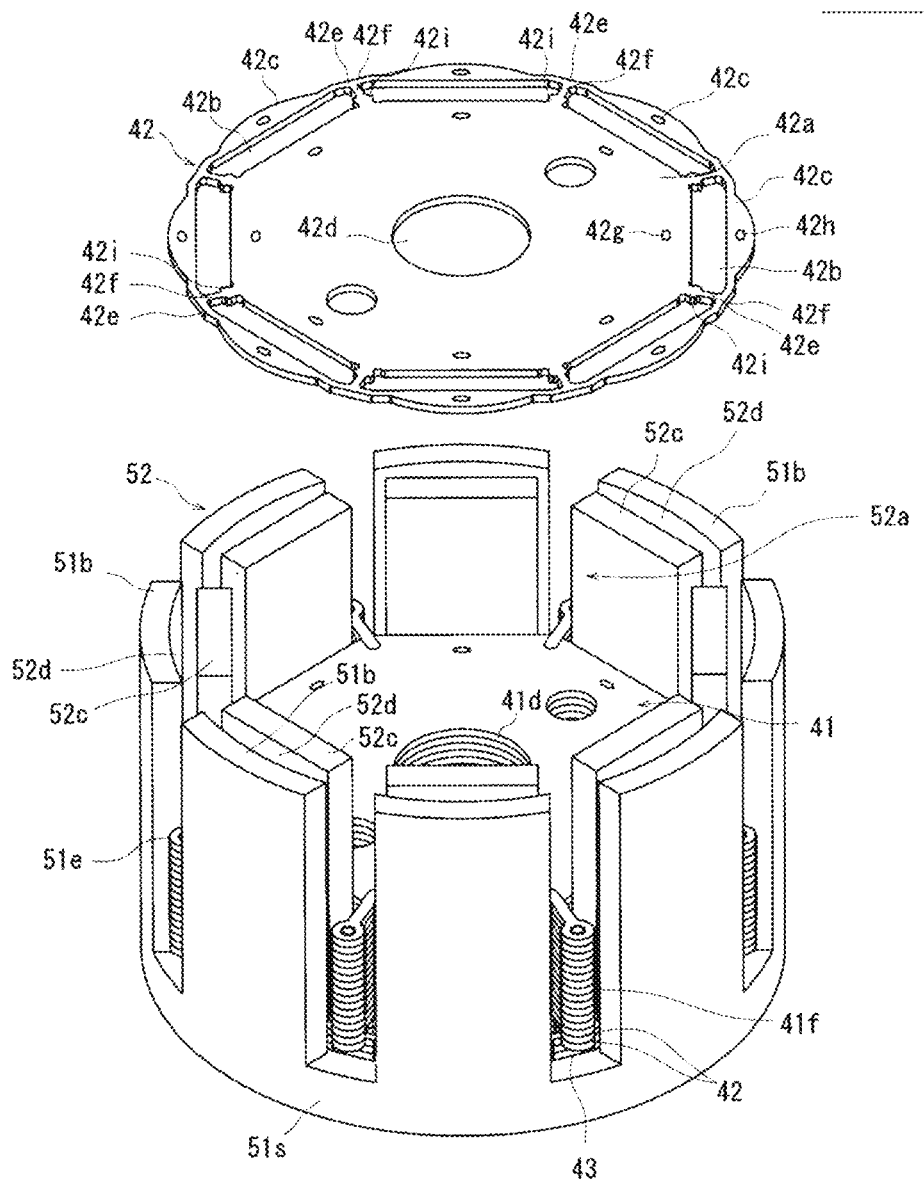
FIG. 26 is a perspective view illustrating a part of the laminating step performed after FIG. 25.

The first laminated steel plate 41, the second laminated steel plate 42, and the connecting laminated steel plate 43 formed in the laminated steel plate forming step S301 are sequentially inserted into a lamination mold 52 and laminated. FIG. 24 is a perspective view illustrating a part of the laminating step. FIG. 25 is a perspective view illustrating a part of the laminating step performed after FIG. 24. FIG. 26 is a perspective view illustrating a part of the laminating step performed after FIG. 25. First, the lamination mold 52 will be described. As illustrated in FIG. 24, an inner side pressing portion which is narrower than the circumferential width of the magnet is used as the lamination mold 52. Accordingly, the configuration of the lamination mold 52 is the same as that of the lamination mold 51 illustrated in FIG. 13 and the like except for a circumferential length of an inner side pressing portion 52c. The portions other than a base portion accommodating space 52a and a flake portion accommodating space 52d will be denoted by the same reference numerals as the lamination mold 51, and detailed description of the same portions will be omitted.

As illustrated in FIG. 24, in the lamination mold 52, the circumferential length of the inner side pressing portion 52c is smaller than the circumferential length of the magnet 32. This is because the convex portion 42i is formed on the second base portion 42a of the second laminated steel plate 42, and the convex portion 43i is provided on the connecting base portion 43a of the connecting laminated steel plate 43. That is, since the circumferential length of the inner side pressing portion 52c does not interfere with the convex portion 42i and the convex portion 43i, the circumferential length of the inner side pressing portion 52c is smaller than the circumferential length of the inner side pressing portion 51c.

In the laminating step S401, first, the connecting laminated steel plate 43 disposed (laminated) at a lower end of the rotor core 40B in the axial direction is disposed at an upper surface of the bottom portion 51s of the lamination mold 52. The connecting laminated steel plate 43 is disposed with the openings of the caulking concave portions of the base caulking portion 42g and the piece caulking portion 42h directed upward. Then, two second laminated steel plates 42 are laminated from above. Further, the second laminated steel plate 42 and the connecting laminated steel plate 43 have the annular portion 42k, and the second connecting portion 42e is disposed between the adjacent flake portions 42c. The portion between the adjacent flake portions 42c overlaps the slit 51e of the lamination mold 52 in the radial direction. For that reason, in the second laminated steel plate 42 and the connecting laminated steel plate 43, a tool, a jig, or the like is inserted into the slit 51e to press the second connecting portion 42e, thereby moving the second laminated steel plate 42 and the connecting laminated steel plate 43. Then, as the second laminated steel plate 42 and the connecting laminated steel plate 43 move, the flake portion 42c also moves.

Further, in the present example embodiment, in order to laminate different types of laminated steel plates, one laminating step and one fixing step may be performed. The details of the fixing step S501 are the same as the fixing step S50 illustrated in FIG. 8 of the first example embodiment. That is, in the caulking process, fixing is performed between the base portions, between the flake portions, and between the protrusions (only in the first laminated steel plate). Then, the laminating and the fixing are repeated until all fixing of laminated steel plates to be laminated are finished.

Specifically, as illustrated in FIG. 25, when the laminating and the fixing of the connecting laminated steel plate 43 and the two second laminated steel plates 42 disposed at the lower end in the axial direction are completed, the first laminated steel plate 41 is laminated from above. Further, in the case of fixing the first laminated steel plate 41, the caulking process of the protrusion caulking portion 41i provided on the protrusion 41f is also performed. Then, when the laminating and fixing of the predetermined number of (here, sixteen) first laminated steel plates 41 are finished, two second laminated steel plates 42, which are laminated at a middle portion of the rotor core 40B in the axial direction, are laminated (see FIG. 26). Thereafter, after the laminating and fixing of the predetermined number of (sixteen) first laminated steel plates 41 are performed on an upper portion of the second laminated steel plate 42 in the axial direction, the laminating and fixing of two second laminated steel plates 42 are performed on an upper portion of the first laminated steel plate 41. That is, in the laminating step S401, at least one or more of each of the second laminated steel plate 42 and the first laminated steel plate 41 are laminated. Also, in the laminating step S401, the plurality of first laminated steel plates 41 are laminated between the second laminated steel plates 42 adjacent in the axial direction. Also, in the laminating step, the second laminated steel plate 42 is disposed on at least one end of both ends in the axial direction.

Figure 27:
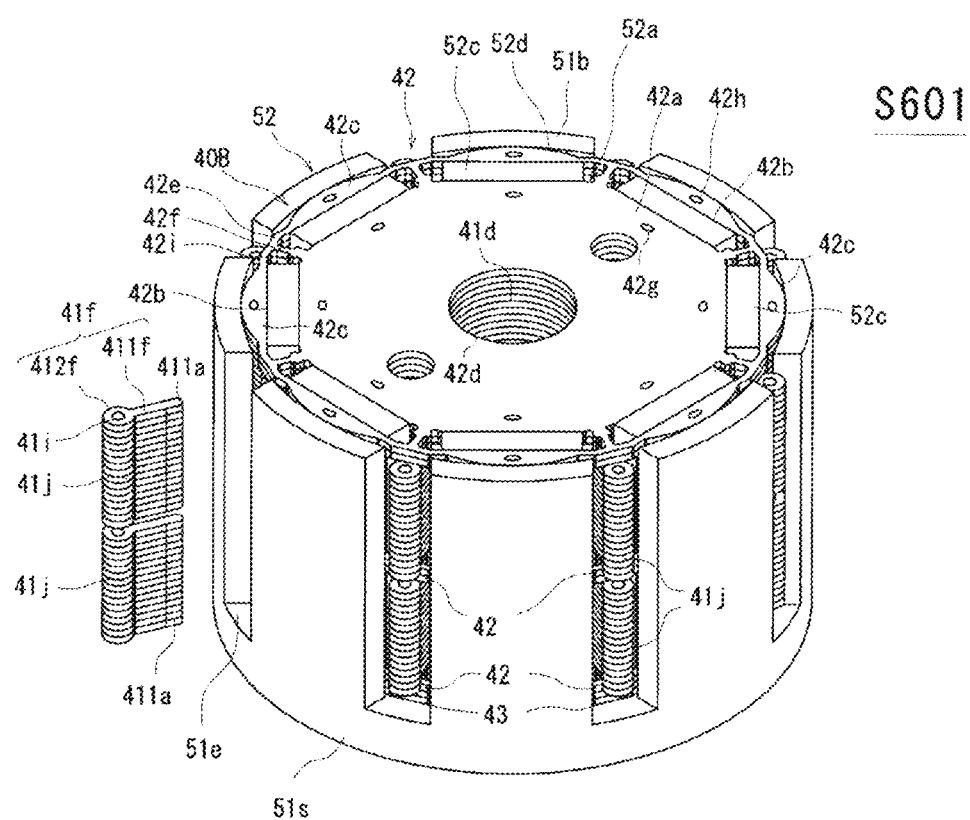
FIG. 27 is a perspective view illustrating a part of a removing step according to an example embodiment of the present disclosure.
Figure 28:
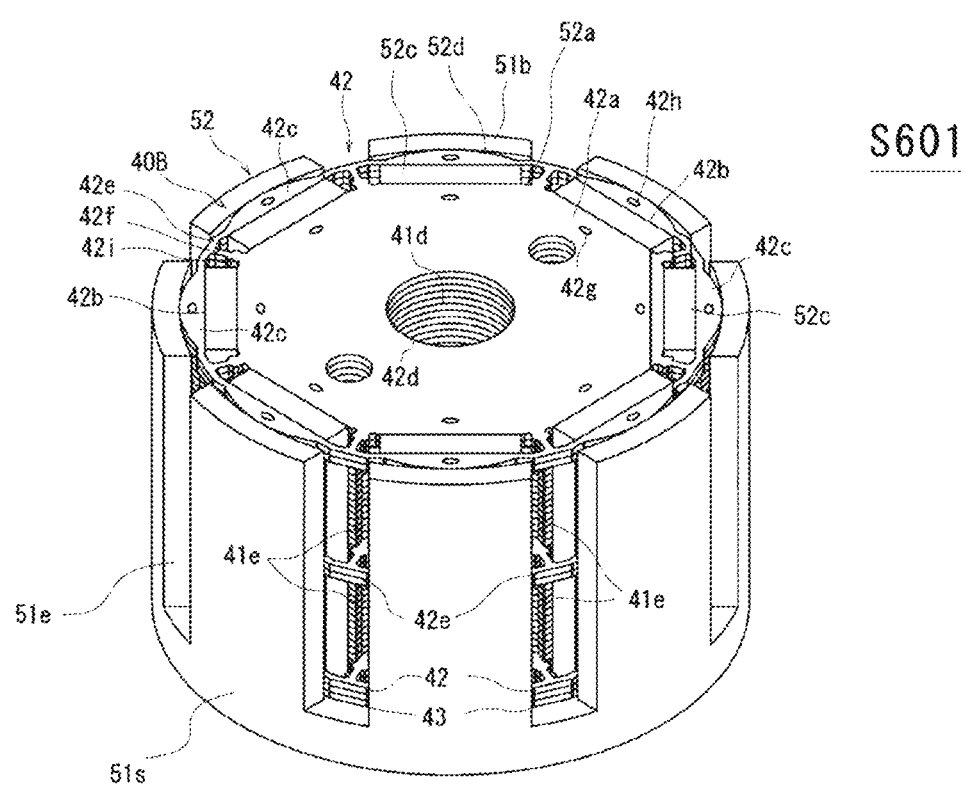
FIG. 28 is a perspective view illustrating the end of the removing step according to an example embodiment of the present disclosure.

FIG. 27 is a perspective view illustrating a part of a removing step. FIG. 28 is a perspective view illustrating the end of the removing step. After all of the laminated steel plates intended to be used in manufacturing the rotor core 40B are laminated, the removing step S601 of removing the protrusion lamination 41j is performed. The basic operation of the removing step S601 is the same as the removing step S60 (see FIG. 8) according to the first example embodiment. That is, the extracting tool Gd is inserted and the protrusion lamination 41j is extracted radially outward from the slit 51e of the lamination mold 52. In the present example embodiment, the second laminated steel plate is laminated in the middle portion, and the protrusion lamination 41j is also interrupted at the middle in the axial direction. For that reason, in the removing step, a process is performed in which each of the upper protrusion lamination 41j, which is vertically divided, is extracted using the extracting tool Gd (see FIG. 27).

In the rotor core 40B of the present example embodiment, as described above, the second laminated steel plates 42 are laminated on the both ends and the middle portion in the axial direction. For that reason, at a time point at which the removing step is completed (see FIG. 28), the relative positions of the base portion and the flake portion are fixed, and the rotor core 40B is completed. That is, the step of using the resin to fill is unnecessary.

Figure 29:
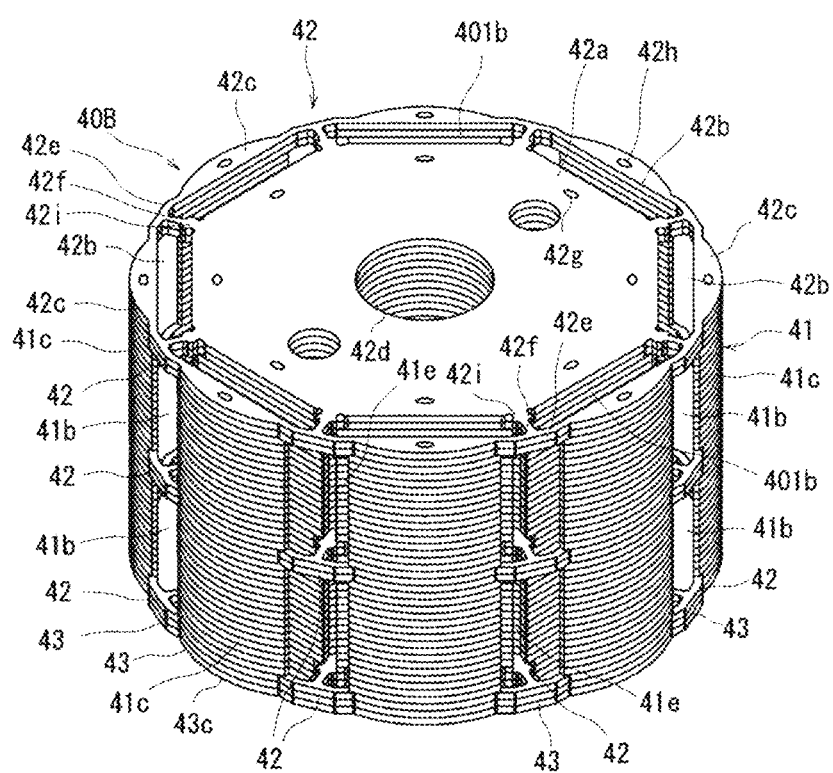
FIG. 29 is a top perspective view of a rotor core manufactured using a method of manufacturing a rotor core according to the second embodiment.
Figure 30:
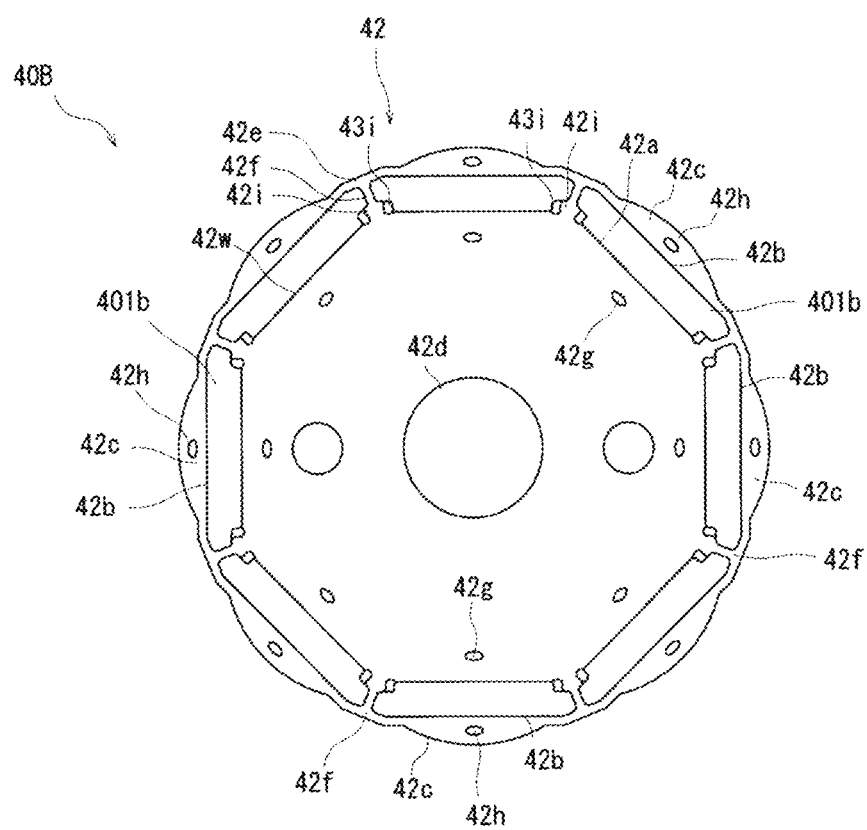
FIG. 30 is a plan view of the rotor core illustrated in FIG. 29.

FIG. 29 is a top perspective view of a rotor core manufactured using the method of manufacturing a rotor core according to the second example embodiment. FIG. 30 is a plan view of the rotor core illustrated in FIG. 29. The magnet 32 is inserted axially downward from the through-hole 42b at the axial upper end of the rotor core 40B illustrated in FIG. 29. A circumferential end face of the magnet 32 comes into contact with a circumferential end face of the convex portion 42i. Consequently, the magnet 32 does not move or is difficult to move in the circumferential direction thereof, and thus the displacement of the magnet 32 in the circumferential direction can be suppressed.

Then, as illustrated in FIG. 30, the convex portion 43i of the connecting laminated steel plate 43 protrudes further toward the through-hole 42b in the circumferential direction than the convex portion 42i of the second laminated steel plate 42. In the case in which the magnet 32 is inserted into the through-hole 42b of the rotor core 40B, a lower end face of the magnet 32 in the axial direction comes into contact with the portion of the convex portion 43i further protruding toward the through-hole 42b than the convex portion 42i. Consequently, downward movement of the magnet 32 in the axial direction can be suppressed, and the detachment of the magnet 32 can be suppressed. Further, in the case in which the magnet 32 does not move or is difficult to move in the axial direction due to adhesion or friction due to contact with the base portion or the flake portion, the connecting laminated steel plate 43 may be omitted. Also, in some cases, depending on the usage environment of the motor, the magnet 32 may easily be detached in an upward direction in FIG. 30. In this case, the connecting laminated steel plate 43 may be laminated at an upper portion of the rotor core 40B. Also, after the rotor core 40B is withdrawn from the lamination mold 52 and the magnet 32 is inserted into the rotor core 40B, the connecting laminated steel plate 43 may be laminated on the upper end of the rotor core 40B in the axial direction. By disposing the connecting laminated steel plate 43 at the both ends of the rotor core 40B in the axial direction, movement of the magnet 32 in the axial direction can be suppressed.

In the rotor core 40B of the present example embodiment described above, using the second laminated steel plate 42, a laminated body of the first base portion 41a of the first laminated steel plate 41 and a laminated body of the flake portion 41c are fixed relative to each other. Consequently, since the resin portion is unnecessary, it is possible to simplify the manufacturing steps. Also, since the weight of the rotor, which is a rotating body, can be reduced by not providing the resin portion, power saving and high efficiency of the motor can be achieved.

Further, in the rotor core 40B, in the second laminated steel plate 42, the flake portion 42c is connected to the second connecting portion 42e, and the first connecting portion 42f is disposed between the adjacent magnets 32. For that reason, in the rotor core 40B, the adjacent flake portions 41c are separated in most of the middle portion in the axial direction. Also, in the rotor core 40B, in most of the middle portion in the axial direction, a layer of air, i.e., a flux barrier, is formed between the magnets 32. For that reason, even in the configuration without a resin column, the flux barrier can be formed, and the occurrence of a magnetic flux loop can be suppressed. Consequently, it is possible to improve magnetic characteristics of the rotor 3.

In the above-described rotor core 40B, a total of six second laminated steel plates 42 are laminated, two each at the both ends and the middle portion in the axial direction. In the fixing step, the laminated body of the first base portion 41a of the first laminated steel plate 41 and the second base portion 42a of the second laminated steel plate 42 are fixed by the caulking process. Also, the laminated body of the flake portion 41c of the first laminated steel plate 41 and the flake portion 42c of the second laminated steel plate 42 are fixed to each other by the caulking process. For that reason, the second laminated steel plate 42 may not be attached to the both ends of the rotor core 40B in the axial direction. Also, in the case in which sufficient strength can be secured, the number of second laminated steel plates 42 may be one. Also, the influence of the second laminated steel plates 42 may be reduced by using the first laminated steel plate 41 and the second laminated steel plate 42 having different thicknesses in the axial direction. In addition, the second laminated steel plates 42 having various thicknesses may be prepared, and thick second laminated steel plates 42 may be used for a portion having little influence on the magnetic characteristics, and thin second laminated steel plates 42 may be used for a portion having large influence on the magnetic characteristics. Also, in the rotor core 40B using the second laminated steel plates 42, the space portion 41k between the magnets 32 adjacent in the circumferential direction, the gap 41t of the flake portion 41c, and the concave portion 41e may be filled with resin.

According to an exemplary rotor core manufacturing method of the present disclosure, it is possible to manufacture a motor capable of more effectively utilizing magnetic flux of a magnet. Also, according to a rotor and a motor of the present disclosure, it is possible to more effectively utilize magnetic flux of a magnet.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor comprising:
    a rotor core including a base portion located radially outward from a central axis and a plurality of flake portions arranged radially outward from the base portion; and
    a plurality of magnets disposed inside the rotor core, wherein
    in the rotor core, first laminated steel plates are laminated in an axial direction, each of the first laminated steel plates including the base portion, some of the plurality of flake portions spaced apart from the base portion on a radially outer side of the base portion with first gaps therebetween and arranged in a circumferential direction with second gaps between each other, and concave portions concave radially inward from an outer side surface of the base portion,
    the concave portions are defined in corner portions where portions of the base portion facing the plurality of flake portions in a radial direction are adjacent in a circumferential direction,
    circumferential widths of the concave portions are the same in the radial direction or are larger on a radially outer side than on a radially inner side, the rotor core includes a second laminated steel plate including the base portion, at least one of the plurality of flake portions, and a connecting portion that connects the base portion and the at least one of the plurality of the flake portions, at least the second laminated steel plate is laminated together with the first laminated steel plate, and a circumferential length of at least one of the plurality of flake portions of the first laminated steel plate is smaller than a circumferential length of the magnet, and a circumferential length of the at least one of the plurality of flake portions of the second laminated steel plate is smaller than that of one of the some of the plurality of flake portions of the first laminated steel plate.

2. The rotor according to claim 1, wherein the rotor core includes two or more of the second laminated steel plates, and a plurality of the first laminated steel plates are laminated between the two or more of the second laminated steel plates.

3. The rotor according to claim 1, wherein, the second laminated steel plate is disposed on at least one end of two opposed ends of the rotor core in the axial direction.

4. The rotor according to claim 1, wherein:
the rotor core further comprises a space portion between the magnets adjacent in the circumferential direction; and
the concave portion, the second gaps, and the space portion of the rotor core are filled with a filler.

5. A motor comprising the rotor according to claim 1.

6. A rotor comprising:
a rotor core including a base portion located radially outward from a central axis and a plurality of flake portions arrangeed radially outward from the base portion; and
a plurality of magnets disposed inside the rotor core; wherein
in the rotor core, first laminated steel later are laminated in an axial direction, each of the first laminated steel plates including the base portion, some of the plurality of flake portions spaced apart from the base portion on a radially outer side of the base portion with first gaps therebetween and arranged in a circumferential direction with second gaps between each other, and concave portions concave radially inward from an outer side surface of the base portion, the concave portions are defined in corner portions where portions of the base portion facing, the plurality of the flake portions in a radial direction are adjacent in a circumferential direction, circumferential widths of the concave portions are the same in the radial direction or are larger on a radially outer side than on a radially inner side, the rotor core includes a second laminated steel plate including the base portion, at least one of the plurality the flake portions, and a connecting portion that connection the base portion and the at least one of the plurality of the flake portions, at least the second laminated steel plate is laminated together with tine a first laminated steel plate, and a circumferential length of an outer circumferential surface on a radially outer side of the at least one of the plurality of flake portions of the second laminated steel plate is smaller than a circumferential length of an outer circumferential surface on a radially outer side of at least one of the some of the plurality the flake portions of the first laminated steel plate.

7. The rotor according to claim 6, wherein the rotor core includes two or more of the second laminated steel plates, and a plurality of the first laminated steel plates are laminated between the two or more of the second laminated steel plates.

8. The rotor according to claim 6, wherein, the second laminated steel plate is disposed on at least one end of two opposed ends of the rotor core in the axial direction.

9. The rotor according to claim 6, wherein:
the rotor core further comprises a space portion between the magnets adjacent in the circumferential direction; and
the concave portion, the second gaps, and the space portion of the rotor core are filled with a filler.

10. A motor comprising the rotor according to claim 6.

* * * * *